United States Patent
Mercado-Alcala et al.

(10) Patent No.: US 12,259,976 B1
(45) Date of Patent: Mar. 25, 2025

(54) DETECTING RANSOMWARE ATTACKS IN A DEVICE BASED ON DEVICE BEHAVIOR

(71) Applicant: HackerStrike Corporation, Los Altos, CA (US)

(72) Inventors: Jessica Y. Mercado-Alcala, Mexico City (MX); Ralph Aceves, Los Altos, CA (US)

(73) Assignee: HACKERSTRIKE CORPORATION, Los Altos, CA (US)

( * ) Notice: Subject to any disclaimer, the term of this patent is extended or adjusted under 35 U.S.C. 154(b) by 302 days.

(21) Appl. No.: 17/993,757

(22) Filed: Nov. 23, 2022

Related U.S. Application Data

(60) Provisional application No. 63/282,672, filed on Nov. 23, 2021.

(51) Int. Cl.
| | |
|---|---|
| *G06F 21/56* | (2013.01) |
| *G06F 21/53* | (2013.01) |
| *G06F 21/57* | (2013.01) |
| *G06N 3/08* | (2023.01) |

(52) U.S. Cl.
CPC ............ *G06F 21/566* (2013.01); *G06F 21/53* (2013.01); *G06F 21/577* (2013.01); *G06N 3/08* (2013.01); *G06F 2221/034* (2013.01)

(58) Field of Classification Search
CPC ...... G06F 21/566; G06F 21/53; G06F 21/577; G06F 2221/034; G06N 3/08
USPC .......................................................... 726/23
See application file for complete search history.

(56) References Cited

U.S. PATENT DOCUMENTS

| 11,588,830 | B1* | 2/2023 | Bilgrami | G06F 18/24765 |
| 2017/0337372 | A1* | 11/2017 | Zhang | G06F 21/53 |
| 2017/0366562 | A1* | 12/2017 | Zhang | G06N 20/00 |
| 2018/0018459 | A1* | 1/2018 | Zhang | G06F 21/566 |
| 2019/0251259 | A1* | 8/2019 | Stepanek | G06F 21/554 |
| 2019/0266327 | A1* | 8/2019 | Satpathy | G06F 21/6218 |
| 2019/0347418 | A1* | 11/2019 | Strogov | G06F 21/44 |
| 2020/0159624 | A1* | 5/2020 | Malkov | G06N 20/00 |
| 2021/0004726 | A1* | 1/2021 | Shang | G06F 18/24 |
| 2022/0067738 | A1* | 3/2022 | Fang | G06Q 20/389 |
| 2022/0067752 | A1* | 3/2022 | Fang | H04L 63/20 |

FOREIGN PATENT DOCUMENTS

| WO | WO-2022005876 A1 * | 1/2022 | ............. G06F 18/23 |

* cited by examiner

*Primary Examiner* — Liang Che A Wang
(74) *Attorney, Agent, or Firm* — Pillsbury Winthrop Shaw Pittman LLP

(57) ABSTRACT

Disclosed are techniques to detect and prevent malware attacks, and more specifically, a subset of malware attacks called ransomware (which is not to suggest that the disclosed techniques are not applicable to detecting other types of malware attacks that exhibit some of the same behaviors). Example embodiments disclose systems, like a ransomware protection service (RPS) and platform, and techniques employed by such systems to detect and stop ransomware from encrypting files and systems. Disclosed techniques implemented by the RPS and platform are expected to provide protection against new or unknown ransomware malware, also known as zero-day attacks.

21 Claims, 7 Drawing Sheets

DETECTING RANSOMWARE ATTACKS IN A DEVICE BASED ON DEVICE BEHAVIOR

CROSS-REFERENCE TO RELATED APPLICATIONS

The present non-provisional application claims the benefit of U.S. Provisional Patent Application No. 63/282,672, filed 23 Nov. 2021. The contents of each aforementioned patent filing is incorporated by reference herein in its entirety.

BACKGROUND

1. Field

The present disclosure relates generally to computer-implemented techniques to detect malicious programs and, more specifically, to detection of malicious programs to prevent a malicious program from encrypting files and systems.

2. Description of the Related Art

A majority of cybersecurity products in the market today rely on having a previously known malware as a reference to determine if an incoming file is a malware or not. In order to accomplish this, antivirus and other protection products scan at the file system level to make the determination. However, a drawback with such a method is that it leaves a device vulnerable to any unknown malwares. Accordingly, certain activities of such unknown malwares may run unabated on infected systems. Thus, for example, one type of malware, which may be referred to as ransomware, may execute to prevent user access to an infected system or files on (or accessible by) an infected system for the purpose of extorting the system owner.

Ransomware attacks are often implemented by concealing a virus (like a Trojan horse virus) as or within a file (e.g., that appears legitimate) such that a user obtains the file on their computer system. When the user opens, executes, or otherwise access the file, the virus may infect the system. In some other examples, a virus (like a worm) may infect susceptible computer systems without direct user involvement. In either example (among others), the virus may execute to lock the computer system (in some cases by encrypting the file system or hard drive partition) or encrypt files on or accessible by the computer system. In turn, an attacker (e.g., author or user of the virus) may extort an owner of the computer system into paying a fee to the attacker in exchange for unlocking the computer system or decrypting the encrypted files.

SUMMARY

The following is a non-exhaustive listing of some aspects of the present techniques. These and other aspects are described in the following disclosure.

In some aspects, a process or computer-implemented method includes obtaining device behavior data from a plurality of user devices, the device behavior data includes runtime activity information associated with respective user devices. The behavior data may be segmented by categories of runtime activity information sources monitored on the user devices to obtain a plurality of by-category training data sets. Records of a training data set may be formed to train a machine learning model.

In some aspects, a given training data set may comprise records corresponding to a user device or a plurality of different ones of the user devices. A first subset of the records in a given training data set may be labeled as malicious based on indications of a subset of user devices affected by ransomware and a second subset of the records may be labeled and non-malicious based on indications of another subset of user devices (or a user device) not affected by ransomware. One or more machine learning models may be trained using the training data sets.

In some aspects, a machine learning model is trained on a given training data set to output an indication of whether runtime activity information obtained from the category of runtime activity information source corresponds to ransomware activity. One or more trained machine learning models, like a set of such models, corresponding to respective categories of runtime activity sources may be transmitted to one or more user devices. A user device may execute a set of machine learning models to monitor a set of runtime activity information sources for ransomware activity.

Some aspects include a tangible, non-transitory, machine-readable medium storing instructions that when executed by a data processing apparatus cause the data processing apparatus to perform operations including one or more of the above-mentioned processes.

Some aspects include a system, including: one or more computing devices with one or more processors; the one or more computing devices including at least one memory storing instructions that when executed by the processors cause the processors to effectuate operations including one or more of the above-mentioned processes.

BRIEF DESCRIPTION OF THE DRAWINGS

The above-mentioned aspects and other aspects of the present techniques will be better understood when the present application is read in view of the following figures in which like numbers indicate similar or identical elements.

Figure 1A:
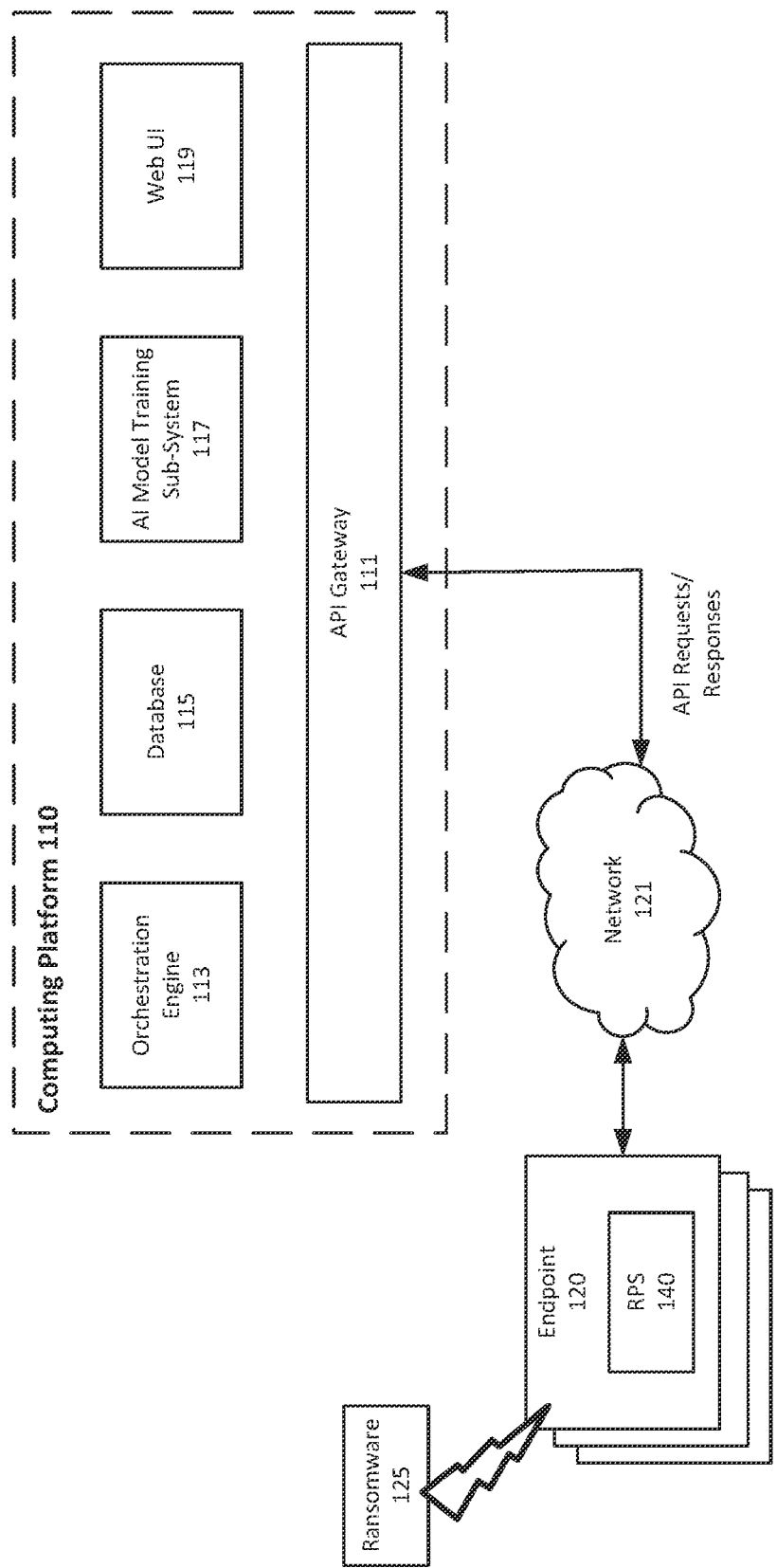
FIG. 1A shows an example environment for monitoring ransomware in an endpoint, in accordance with one or more embodiments.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the field of malware detection and prevention. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

Disclosed are techniques to detect and prevent malware attacks, and more specifically, a subset of malware attacks called ransomware (which is not to suggest that the disclosed techniques are not applicable to detecting other types of malware attacks that exhibit some of the same behaviors). Example embodiments disclose systems, like a ransomware protection service (RPS) and platform, and techniques employed by such systems to detect and stop ransomware from encrypting files and systems. Disclosed techniques implemented by the RPS and platform are expected to provide protection against new or unknown ransomware malware, also known as zero-day attacks. Accordingly, the disclosed techniques are expected to improve resilience of endpoint systems to zero-day attacks relative to traditional signature-based detections (e.g., detection of malware based on signatures of previously identified malware). Specifically, embodiments of the disclosed techniques may monitor behavior on an endpoint to detect malicious activity, which may correspond to a zero-day attack (which is not to suggest that non-zero-day attacks on susceptible systems, such as those which have not been patched to obviate a known threat, cannot be detected). Aspects of the RPS or platform may be implemented as hardware, software, or as a combination thereof. Further, the RPS platform may be implemented as a distributed system in which components of the RPS platform may be distributed over a number of computer systems. For example, components of the RPS platform may be distributed over a number of different computer systems (e.g., 10, 100, or more such systems, which may be geographically distributed) within a cloud computing environment and support a number of endpoints (e.g., hundreds, thousands, or hundreds of thousands or more) that execute a client side service component (e.g., the RPS).

FIG. 1A illustrates an example computing environment 100A for monitoring ransomware in an endpoint, in accordance with one or more embodiments. In some embodiments, the computing environment 100A may include a computing platform 110 and endpoint devices 120. These components may communicate with one another via a network 121, such as the Internet and various other local area networks. In some embodiments, the techniques described herein may be implemented within the computing environment 100A (e.g., including one or more of the illustrated components) shown in FIG. 1A by executing processes described below, illustrated by way of examples in other Figures, or otherwise described in the present application upon computing devices like those described below with reference to FIG. 6. In some embodiments, computing devices like those described with reference to FIG. 6 may include additional and/or other components specific to configurations discussed herein, such as with reference to FIG. 1B, as different endpoints (e.g., according to their operating system or other factors) may be monitored in different ways.

FIG. 1A illustrates an example ransomware 125 attack on an endpoint 120, which may correspond to an attempt by an attacker to encrypt files on or accessible by the endpoint or the endpoint system, such as to extort an owner of the endpoint into payment in exchange for decryption of the system or files. In some embodiments, the endpoint 120 executes a client-side service, i.e., the RPS 140, for ransomware detection and prevention. Thus, for example, in accordance with techniques described herein, the RPS 140 may detect and prevent and malicious activities of the ransomware 125 should an attack, in an initial phase, succeed in causing the endpoint 120 to obtain or execute the ransomware.

Embodiments of endpoints 120 may include various example computing devices or systems that include one or more computing devices. The computing devices, in various embodiments, may execute an operating system within which other applications (e.g., native applications) or services may be executed to perform various tasks. An example of such a native application or service may include the RPS 140, which may be executed on a computing device to detect and prevent malicious activities of ransomware 125 on the computing device. In some embodiments, an endpoint 120 may be a personal computer, like a laptop or desktop computer, or mobile phone, tablet, gaming system, or portable handheld gaming system operable to execute the RPS 140, among other applications. Other examples of an endpoint 120 may include a server (which may comprise multiple computing devices) or a server system (which may comprise multiple servers) operable to execute the RPS 140, among other applications (which may include various distributed applications or containers). Additional examples of an endpoint 120 may include internet of things (IoT) devices, autonomous vehicles, routers, switches and other networking devices, or other devices or systems operable to execute the RPS 140, among other applications.

In some embodiments, the RPS 140 is a native application or service configured for execution by one or more endpoint 120 computing devices. Different endpoint 120 devices may execute respective versions of a RPS 140, such as a given version based on one or more a type of endpoint device or operating system of the endpoint. In some cases, multiple endpoints 120 of a same type or different types may execute those different versions of an RPS 140 which may respectively comprises a subset of functionality specific to a type or operating system of the different endpoints. An endpoint 120, in some examples, my obtain a version of the RPS 140 that corresponds to the type of endpoint or operating system of the endpoint from a computing platform 110 that supports functionality of the RPS or from a repository (which may be a 3$^{rd}$ party repository, like an application store) that provides native applications to endpoints with a given operating system. In other examples, an RPS 140 may be pre-loaded on an endpoint 120, distributed in connection with an operating system that may be installed on an endpoint, or distributed via a physical medium by which an installer for the RPS may be accesses and executed by an endpoint. In some embodiments, an RPS 140 on an endpoint 120 may be updated, such as with an over the air update, distributed by the computing platform 110. The RPS 140, in some examples, may perform an update check with the computing platform 110 (or application repository), such as upon execution, or periodically, to ascertain whether an update is available (e.g., from the computing platform 110 or application repository) for the RPS 140. In other examples, the endpoint 120 may receive an indication, like a notification, one example of which may be a push notification, that an update for the RPS 140 is available (e.g., from the computing platform 110 or application repository). In some examples, the endpoint 120 may receive update files for the RPS 140 automatically (e.g., when the endpoint 120 has an active connection to the network 121, such as the internet) and the RPS 140 may be updated responsive to obtaining the update or in accordance with a schedule (e.g., at midnight or upon restart of the RPS or endpoint) after obtaining the update. Functionality of the RPS is discussed in greater detail with reference to FIG. 1B.

In some embodiments, the computing platform 110 is a computing device, like a server, that provides functionality supporting instances of RPS 140 applications or services executed by respective endpoints 120, such as in a client-server architecture. In some embodiments, functionality of the computing platform 110 may be distributed amongst a variety of different computing devices, some which may be servers providing respective functionality. Different functionality may be distributed in different ways. For example, some functionality may be executed by a collection of server devices and results of executing that functionality distributed to other server devices, which may be geographically distributed and provide other functionality. Example functionalities of the computing platform 110 may include, but are not limited to, an application programming interface gateway 111, orchestration engine 113, database 115, AI model training sub-system (which may be referred to herein as the training module) 117, and a web user interface 119. In the context of a computing platform 110 for which functionality may be distributed across different computing devices, one or more AI models may be generated by the training module 117 executed by a first collection of computing devices and those models, or parameters corresponding to those models, may be provided to a second collection of computing devices, like storage servers, which may be geographically distributed to implement respective instances of a database 115, and a third collection of computing devices, which may also be geographically distributed, such as within areas which various endpoints 120 are located, may respectively implement an API gateway 111 and web UI 119, among other functionality, to support the endpoints 120 located within a respective geographic area. Additionally, one or more computing devices, which may be a different collection of computing devices, one of the above noted collections, or a mix of computing devices corresponding to the above noted collections of computing devices, may execute the orchestration engine 113 (or instance thereof) to facilitate training operations, distribution of updated models or parameters, or other functionality of the computing platform 110 on a computing device, collection of computing devices, or across different collections of computing devices. Thus, for example, the computing platform 110 may have a hub and spoke client-server based architecture in which a subset of functionality, such as model training (e.g., by the training module 117), is implemented at a relatively centralized collection (e.g., first collection) of computing devices (e.g., a hub) which orchestrates the distribution of results (e.g., updated models or parameters) to other geographically distributed (e.g., first and second collections) computing devices (e.g., spokes) that are located closer (e.g., physically, logically along a network traffic flow, or both) to endpoints and provide the results and other functionally to the endpoints. The above examples should not be construed as limiting, as embodiments contemplate distribution of functionality in different ways, or may consolidate the functionality of the computing platform 110 on a single computing device or collection thereof.

As shown, the computing platform 110 may include an API gateway configured to service API requests. For example, the API gateway may receive API requests (such as from endpoints 120) and generate responses to API requests which may be communicated to endpoints, or otherwise communicate data from the computing platform 110 to endpoints 120 or vice versa. An example of such an API gateway 111 may expose a RESTful API that provides a function set (e.g., for requests to and responses from the API) commonly expected by developers in order to extend functionalities of the computing platform 110 across a number of different endpoint types or operating systems utilized by different endpoints. The RESTful API service may serve as a method of abstraction to implement backend functionality of the computing platform 110 (e.g., transparently from an endpoint perspective, in some cases) within the context of distributed cloud compute and storage solution systems, like AMAZON S3™, among other web services that are configured to interface with REST APIs. Other embodiments may employ other types of APIs capable of providing the ascribed functionality.

In some embodiments, an orchestration engine 113 may be implemented by the computing platform 110 to coordinate the execution of the different functionalities of the computing platform 110 and conveyance of data between the various other components of the computing platform. In some example embodiments, the orchestration engine 113 may be a resident back-end functionality of a distributed cloud compute and storage solution system to facilitate the processing of requests or data, or storage of such information, received via the API Gateway 111 by various components of the computing platform 110 upon different computing devices or virtual machines (e.g., on-demand) and conveyance of data responsive to requests (or otherwise) from the components to the API Gateway for generation of API responses. In some examples, the orchestration engine 113 may perform function calls to the other components of the computing platform 110, such as based on a routine, or responsive to conditions identified based on certain criteria (e.g., like upon identification of a zero-day threat detected by one or more endpoints), to coordinate the training of one or more models based on obtained data corresponding to the newly identified threat and conveyance of those updated models or updated parameters for one or more models for updating RPS 140 instances across a plurality of endpoints 120.

In some embodiments, the database 115 stores data utilized by one or more components of the computing platform 110. The data may include various models in various states of training, the parameters of such models, and data by which the models are trained. For example, the database 115 may store training data by which the training module 117 trains models for detection and prevention of ransomware 125 attacks by instances of the RPS 140 executed by endpoints 120. The database 115 may receive the data by which the models are trained via the API Gateway 111 from endpoints 120. For example, a wide range of endpoints 120 may report behavior data to the API Gateway 111, such as periodically, which may be stored within the database 115. The behavior data received from the endpoints 120 may be pre-processed prior to one or more training operations or used directly. In either case, a training data set may be stored by the database 115 and include training records by which one or more models are trained and validation records by which the efficacy of trained models is evaluated and validated by the training module 117. Trained models, or parameters thereof, determined by the training module 117 may be stored within the database 115. In some examples, the trained models or parameters thereof may be distributed by the computing platform 110 to the endpoints 120 in the form of a micro-neural network (or other model) or parameters of neurons within a neural network (micro or otherwise) that is implemented within the RPS 140. Such an architecture removes the need for each individual endpoint to process large amounts of data and can improve the efficiency and accuracy of ransomware detection by a trained neural network (or other trained model) as the training data set for generating the model may comprise behavioral data spanning a vast number of endpoints 120.

In some embodiments, the AI model training sub-system (training module) 117 trains one or more models to be implemented by instances of the RPS 140 that are executed by endpoints 120. For example, embodiments of the training module 117 may use supervised, unsupervised, or semi-supervised machine learning algorithms to train a machine learning model to detect ransomware. In some embodiments, the training module 117 uses supervised or semi-supervised learning to derive models. Supervised and semi-supervised learning may employ a machine learning task with the objective of deriving a model that maps a set of inputs to an output based on at least some sample input-output data. Models trained by one or more training algorithms implemented by the training module 117 may be pushed by the computing platform 110 (e.g., like an update, via the API Gateway 111) otherwise communicated to one or more endpoints 120 to be used by their RPS 140 instance to classify endpoint system behavior as healthy (normal) or as a ransomware attack. Example supervised and semi-supervised learning techniques employed for training models to detect and prevent ransomware may include, but are not limited to, techniques such as Light Gradient Boost Machine (Light GBM), XGBoost, convolutional neural networks, recurrent neural networks, random forests, logistic regression, and K-means. Training of a neural network may employ backward propagation techniques, or gradient decent, or other optimization algorithms to reduce output error, such as local-minima or maxima of parameters. In some embodiments, a number of different models may be trained, such as component models, which may execute concurrently or in a pipeline at the end-point level to determine if ransomware is acting, present or executing on the endpoint, such as based on monitored behavior.

Additionally, in some examples, different models or different versions of a model may be generated with respect to different types of endpoints or operating systems or combination thereof. Accordingly, in some examples, the database 115 may store different training data sets with respect to different types of endpoints or operating systems employed on endpoints or a combination thereof. The training module 117, in some examples, may be called by the orchestration engine 113 to execute on a given training data set to generate or update a model. Training and validation records identified to the training data set may be updated, such as in response to receiving behavioral data from one or more endpoints 120, and the training module 117 may be called to execute to iteratively train one or more models (e.g., periodically, or based on certain criteria being met) as additional behavioral data is received and the training data set is augmented over time.

Figure 4:
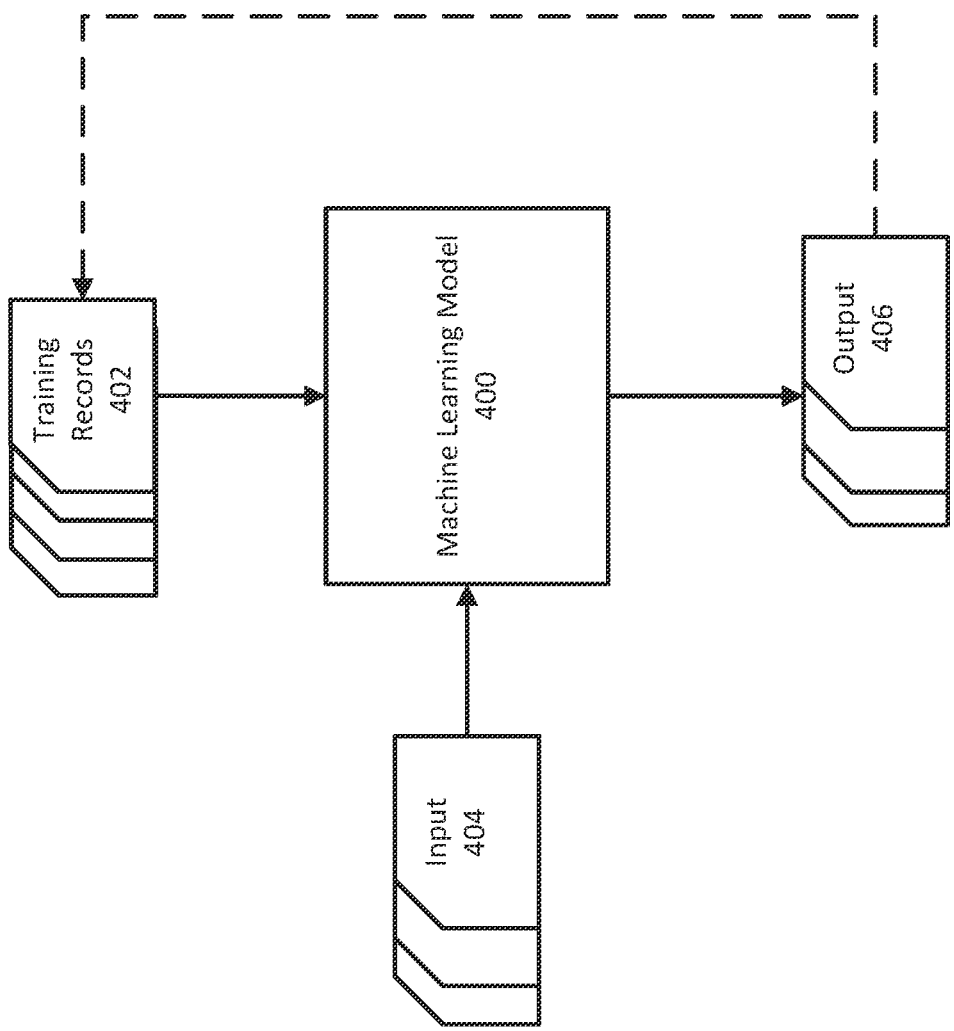
FIG. 4 shows an example of a machine learning model, in accordance with one or more embodiments.

As an example, described with respect to FIG. 4, a machine learning model 402 may take one or more inputs and generate one or more outputs. Examples of a machine learning model 402 may include a neural network or other machine learning model described herein, may take inputs 404 (e.g., input data that described above) and provide outputs 406 (e.g., output data like that described above) based on the inputs and parameter values of the model. For example, the model 402 may be fed an input or set of inputs 404 based on endpoint behavior data for processing, or outputs based on a subset of endpoint behavior data that are determined by other models and provide an output or set of outputs 406. In some cases, outputs 406 may be fed back to machine learning model 402 as input to train machine learning model 402 (e.g., alone or in conjunction with indications of the performance of outputs 406, thresholds associated with the inputs, or with other feedback information, like whether detected anomalous behavior corresponded to a ransomware attack or normal endpoint behavior). In another use case, machine learning model 402 may update its configurations (e.g., weights, biases, or other parameters) based on its assessment of a prediction or instructions (e.g., outputs 406) against feedback information (e.g., detected anomalous behavior correspondence to a ransomware attack, normal endpoint behavior, etc.) or outputs of other models. In another use case, such as where machine learning model 402 is a neural network, connection weights may be adjusted to reconcile differences between the neural network's prediction or instructions and the feedback information. In a further use case, one or more neurons (or nodes) of the neural network may require that their respective errors are sent backward through the neural network to them to facilitate the update process (e.g., backpropagation of error). Updates to the connection weights may, for example, be reflective of the magnitude of error propagated backward after a forward pass has been completed. In this way, for example, the machine learning model 402 may be trained to generate better predictions or instructions.

In some embodiments, the machine learning model 402 may include an artificial neural network. In such embodiments, machine learning model 402 may include an input layer and one or more hidden layers. Each neural unit of the machine learning model may be connected with one or more other neural units of the machine learning model 402. Such connections can be enforcing or inhibitory in their effect on the activation state of connected neural units. Each individual neural unit may have a summation function which combines the values of one or more of its inputs together. Each connection (or the neural unit itself) may have a threshold function that a signal must surpass before it propagates to other neural units. The machine learning model 402 may be self-learning or trained, rather than explicitly programmed, and may perform significantly better in certain areas of problem solving, as compared to computer programs that do not use machine learning. During training, an output layer of the machine learning model 402 may correspond to a classification, and an input known to correspond to that classification may be input into an input layer of machine learning model during training. During testing, an input without a known classification may be input into the input layer, and a determined classification may be output. In some examples, a classification may be an indication of whether endpoint behavior, based on behavior data of an endpoint, corresponds to anomalous behavior, such as endpoint behavior associated with a ransomware attack, like extraction of data from the endpoint or encryption of data on (or accessible by) the endpoint by an attacker. In some examples, a classification may be an indication of a detection of a ransomware attack on an endpoint, such as based on a vector or sequence of vectors indicative of endpoint behavior data. In some examples, a classification may be an indication of a relative preserved distance between a high-dimensionality input (e.g., behavior data collected from various endpoint data sources) and a reduced dimensionality output (e.g., like a state, which may be a normal or expected state, anomalous state, or other classification, like a potential threat level corresponding to the state) within an embedding space. Some example machine learning models may include one or more embedding layers at which information or data (e.g., any data or information discussed herein in connection with example models) may be converted into one or more vector representations. The one or more vector representations may be pooled at one or more subsequent layers to convert the one or more vector representations into a single vector representation.

In some embodiments, a machine learning model 402 may be structured as a factorization machine model. A machine learning model 402 may be a non-linear model or supervised learning model that can perform classification or regression. For example, the machine learning model 402 may be a general-purpose supervised learning algorithm that a system uses for both classification and regression tasks. Alternatively, the machine learning model 402 may include a Bayesian model configured to perform variational inference (e.g., deviation or convergence) of an input from previously processed data (or other inputs in a set of inputs). A machine learning model 402 may be implemented as a decision tree or as an ensemble model (e.g., using random forest, bagging, adaptive booster, gradient boost, XGBoost, etc.). In some embodiments, a machine learning model 402 may incorporate one or more linear models by which one or more features are pre-processed or outputs are post-processed, and training of the model may comprise training with or without pre or post-processing by such models.

In some embodiments, a machine learning model 402 implements deep learning via one or more neural networks, one or more of which may be a recurrent neural network. For example, some embodiments may reduce dimensionality of high-dimensional data (e.g., with hundreds, thousands, or more dimensions) before it is provided to the learning model, such as by forming latent space embedding vectors (e.g., with an order of magnitude reduction or fewer dimensions) based on data described in various embodiments herein to reduce processing complexity, such as by passing a slice of data (e.g., endpoint behavior data obtained over a segment of time) through an encoder. In some embodiments, training of a machine learning model 402 may include the generation of a plurality of latent space embeddings corresponding to states as, or in connection with, outputs 406 of the model which may be classified.

Examples of machine learning models may include multiple models. For example, a clustering model may cluster latent space embeddings represented in training (or output) data. A cluster may indicate information about other latent space embeddings within, or which are assigned to the cluster. For example, a clustering model (e.g., K-means, DBSCAN (density-based spatial clustering of applications with noise), or a variety of other unsupervised machine learning models used for clustering) may take as input a latent space embedding and determine whether it belongs (e.g., based on a threshold distance) to one or more other clusters of other space embeddings that have been previously trained, which may correspond to endpoint behavior states, which may convey a classification, such as anomalous or normal, or an associated threat level, like NORMAL, SUSPICIOUS, WARNING, ATTENTION, or CRITICAL.

Additional examples of machine learning models and training operations by which the AI model training subsystem 117 may generate machine learning models for deployment and execution by RPS 140 on endpoints 120 are discussed in greater detail below.

In some example embodiments, the computing platform 110 facilitates multi-tenant access to respective tenant data within the database 115, such as via the web UI 119. Tenant specific data may include, but is not limited to, management of RPS 140 instances deployed on endpoints 120 managed by respective tenants. For example, an administrator may access the web UI 119 to view information about instances of detections and preventions of ransomware 125 attacks on endpoints 120 associated with the tenant (but not specific information about instances of attacks on endpoints associated with other tenants, which is not to suggest that informational metrics about attacks across multiple tenants may not be aggregated and scrubbed of tenant specific information for informing users about ongoing or prior threats). Some examples of a web UI 119 may be a webpage hosted by a webserver of the computing platform 110, or a web application, accessible by a computing device of a tenant over the network 121. The web UI 119, such as in response to a computing device (which may be a given endpoint) accessing a tenant account, may display information about the various endpoints 120 associated with the tenant which execute an RPS 140 instance. In some examples, the user interface may display information about the state of execution of RPS 140 instances on respective endpoints 120, such as whether an RPS 140 instance is up to date and whether any ransomware 125 have been detected and prevented by the RPS for the respective endpoint.

Some data may be shared across tenants. For example, behavioral data from endpoints across a number of tenants may be scrubbed of tenant specific data (e.g., anonymized) to populate a training data set which may be shared across multiple tenants for training models for use by RPS 140 instances. In other words, training algorithms used by the training module 117, such as to train a neural network, may have access to a shared training data set such that a tenant deploying RPS 140 instances on their endpoints 120 can benefit from overall acquired intelligence from endpoints of other tenants.

Figure 1B:
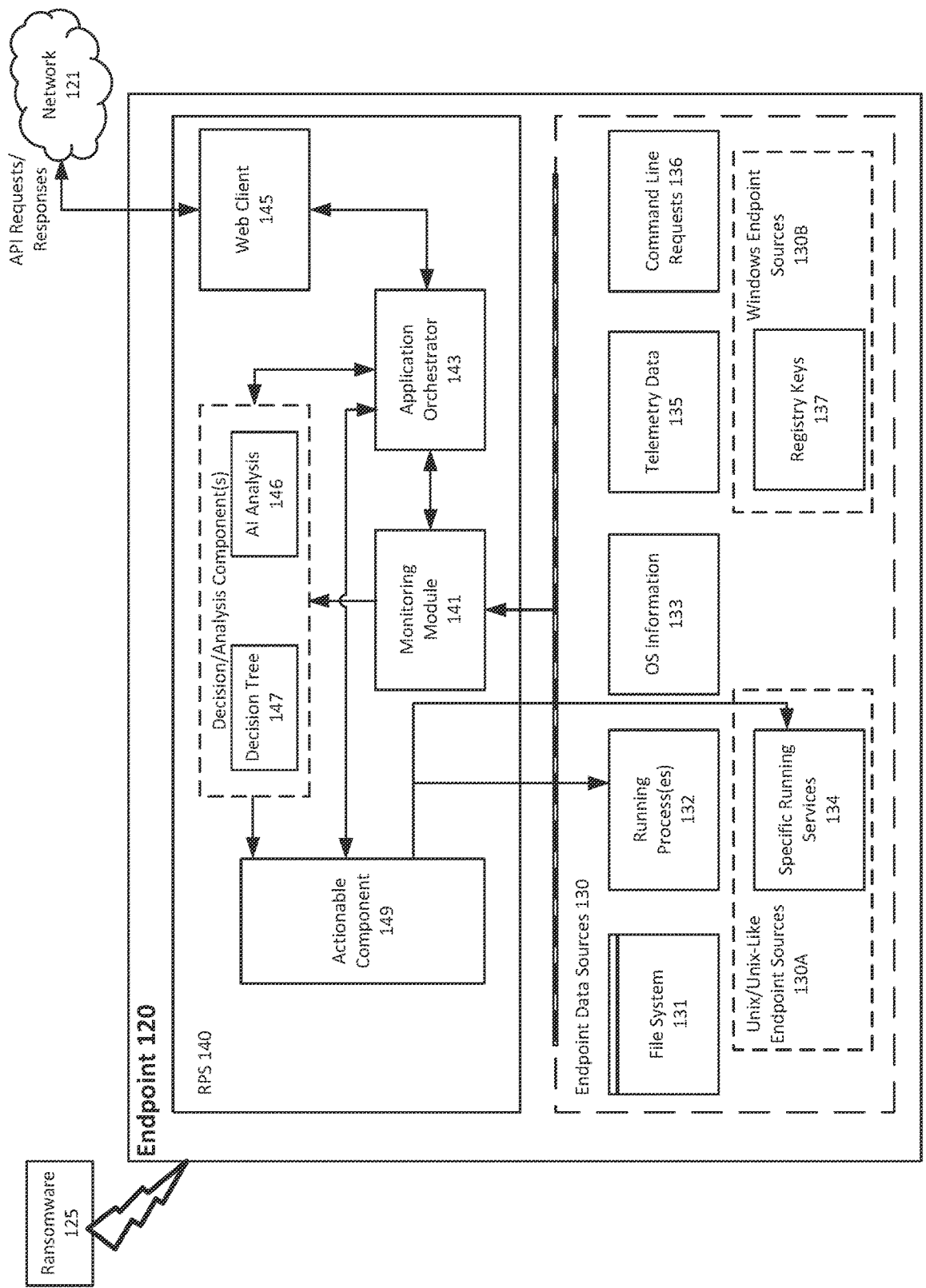
FIG. 1B shows an example environment of an endpoint within which ransomware may be monitored, in accordance with one or more embodiments.

FIG. 1B shows an example environment 100B of an endpoint within which ransomware may be monitored, in accordance with one or more embodiments. An example endpoint 120 which may be the target of a ransomware 125 is shown. The example environment 100B may, as shown, may correspond to a computing environment of a given endpoint 120, which may be of a given type and execute a given operating system. For example, an endpoint 120 may be a x86-based or ARM-based computing system (e.g., as example device types) and execute an example operating system compatible with the type of device. Example operating systems which may be executed on one or more example device types (which is not to suggest that any one endpoint device must be able to execute more than one OS generally compatible with its type) may include, but is not limited to, a WINDOWS based OS or UNIX based OS (e.g., like MAC OS, OSX, IOS etc.) or UNIX-like OS (e.g., like LINUX, ANDROID OS, etc.) operating system.

For the ease of explanation, FIG. 1B illustrates some endpoint data sources 130 as corresponding to respective groupings of operating systems. For example, WINDOWS endpoint sources 130B may include registry keys 137 and Unix/Unix-Like endpoints 130A may include specific running services 134. While some monitoring functionalities may be described as specific to those respective endpoint data sources 130A, 130B, the description and FIG. 1B should not be construed as foreclosing the presence of like or similar data sources across different operating systems (e.g., Windows endpoints may execute a variety services 134, such as via one or more processes 132). In other words, FIG. 1B should be construed as limiting data sources 130 of a given OS to only those depicted, or that each depicted data source must be used, or that other combinations or subsets of sources may exist within other OS implementations. Rather, FIG. 1B serves to illustrate some example data sources 130 that may be used in connection with the present techniques in accordance with various example embodiments described below. In some embodiments, the techniques described herein may be implemented within the computing environment 200A (e.g., including one or more of the illustrated components) shown in FIG. 1B by executing processes described below, illustrated by way of examples in other Figures, or otherwise described in the present application upon computing devices like those described below with reference to FIG. 6. In some embodiments, computing devices like those described with reference to FIG. 6 may include additional and/or other components specific to configurations discussed herein, such as for different endpoints (e.g., according to their type or operating system).

As shown the endpoint 120 may execute an RPS 140. The RPS 140, as described above, may be an application or service executed by the endpoint 120, such as within an OS runtime environment. In some example embodiments, the RPS 140 may be a service implemented within the OS and executed by the endpoint 120 in connection with the OS runtime environment. The RPS 140, in either case, executes to detect and prevent malicious software or virus or malware, like ransomware, from encrypting data and information on an endpoint or a set of devices (e.g., for the purpose of extracting a ransom from endpoints owners in exchange for decrypting the data or otherwise permitting access to such data and information).

As shown, FIG. 1B illustrates an example embodiment of an RPS 140 which may include a number of modules or components to provide their ascribed functionality. Other embodiments of the RPS 140 may distribute functionality in other ways, such as among fewer, or more, components or modules and in different ways. For example, in an embodiment where the RPS 140 is integrated within an operating system, the RPS 140 may utilize a monitoring service integrated within the operating system, and functionality of the web client may be provided through a service of the operating system. Moreover, different versions of an RPS 140, such as with respect to different types of devices and deployments on different operating systems, may provide different subsets of functionality or rely on different subsets of services resident to an operating system without departing the disclosed techniques for detecting and preventing ransomware 125 attacks on a given endpoint 120.

Embodiments of the RPS 140 may detect and prevent activities of unknown malware, including ransomware, based on endpoint 120 device behavior at a lowest possible level of processing. For example, the RPS 140 may monitor and protect endpoint 120 devices at the process or application level and detect abnormal device behavior based on deviations from normal device behavior. Detection at the process or application level is expected to afford much faster detection of ransomware than performance of detections at the overall file system level in an endpoint 120 device (which is not to suggest that performing detection of ransomware at the file system level is disclaimed). Additionally, the RPS 140 may respond to abnormal (e.g., anomalous) endpoint 120 device behavior at the process or application level to prevent, or stop, those processes, services, or applications characterized as exhibiting anomalous behavior. In some embodiments, the RPS 140 may characterize, or receive a characterization (e.g., from a computing platform) of, normal (e.g., expected) endpoint 120 behavior. For example, the RPS 140 may obtain an endpoint 120 device profile, which may be specific to the runtime environment of the endpoint 120. In turn, the RPS 140 may monitor behavior of the endpoint 120 device based on the device profile to detect anomalous behavior (e.g., behaviors that deviate from those characterized in the endpoint device profile) to detect or determine various factors, such as ransomware program execution, cyber-attack initiation, anomalous device activities, anomalous device connections to other devices, among other factors.

Once any of the above anomalous behavior is detected, the RPS 140 may effectuate one or more actions responsive to the detection. For example, the RPS 140 may determine whether criteria of one or more rules are met to effectuate an action, and a user or administrator may specify the actions (and the rules by which criteria are met for effectuating action). Example actions may include, but are not limited to, blocking or stopping one or more (or all) computer processes from executing on an endpoint, monitoring one or more (or all) processes executed by an endpoint, disconnecting an endpoint from a network (which may include terminating a connection of a network interface or disabling network interface by the endpoint or causing a network device or server to disconnect or timeout the endpoint), prevent a user from accessing the endpoint, or other action. In some examples, the RPS 140 may further determine user work effectiveness and efficiency based on detailed device usage analysis, and criteria of one or more rules may be specified for generation of productivity reports corresponding to an endpoint device.

In some embodiments, the RPS 140 includes a monitoring module 141 by which behavioral data is obtained from the endpoint 120. Embodiments of the monitoring module 141 may obtain behavioral data from a variety of different endpoints data sources 130, examples of which may include one or more of, but are not limited to, the file system 131, running processes 132, OS information 133, telemetry data 135 (e.g., processor, memory, disk I/O, network I/O etc. utilization), command line requests 136, running services 134 information, and registry key 137 information. Behavioral data collected by the monitoring module 141 from endpoint data sources 130 may be passed to one or more other components of the RPS 140, such as to decision/analysis components which may detect anomalous behavior in, or across, one or more endpoint data sources. Additionally, behavioral data collected from one or more endpoint data sources 130 may be passed to the application orchestrator 143, such as for logging or conveyance via the web client 145 or other reporting service to a computing platform over the network 121.

Embodiments of the monitoring module 141 may, in some examples, obtain behavior data from endpoint data sources 130 by employing one or more of device type or operating system specific commands. As explained previously, different versions of an RPS 140 may be implemented on a given endpoint 120 based on the operating system, and in some cases device type, of the given endpoint. Behavior data collected by respective versions of the RPS 140 may be aggregated at a computing platform for analysis and training of models employed by the respective RPS 140 versions. In some embodiments, the behavior data collected from the different endpoint data sources 130 is transmitted by the RPS 140, such as via the web client 145, to an API implemented by a computing platform, like computing platform 110 described with reference to FIG. 1A. The behavior data conveyed to the computing platform may be used as training data for updating models employed by the RPS 140 to detect ransomware based on behavior data collected at runtime by the monitoring module 141. In some embodiments, the different data types, such as by endpoint data source 130, may be formatted into respective JSON files, which may have data structures corresponding to the respective data source (and those data structures may, in some examples, for some data sources, be specific to one or more of a device type or operating system of an endpoint) to allow flexibility and the ability to extend monitoring to other available or new data sources over time (or based on level of privileges afforded to different RPS 140 deployments, such as via native application, OS integration, etc.) on monitored endpoints 120.

In some embodiments, an application orchestrator 143 coordinates the execution of the different functionalities of the RPS 140 and conveyance of data between the various other components of the RPS 140. In some example embodiments, the orchestration engine 143 may obtain and structure behavior data collected by the monitoring module 141 for reporting to a computing platform, such as by calling a web client 145 to generate a request to an API of the computing platform to report obtained behavior data. The orchestration engine 143 may receive API responses and other data received from a computing platform by the web client 145. For example, the orchestration engine 143 may receive one or more models or parameters for updating models employed by a decision/analysis component of the RPS 140. In another example, the orchestration engine 143 may receive criteria for rules and corresponding actions, like a policy, which a decision/analysis component of the RPS 140 may use to determine whether a given action is to be performed responsive to an analysis of runtime behavior data collected from endpoint data sources 130. The application orchestrator 143 may obtain information about determinations made by decision/analysis components of the RPS 140 and information about the effectuation of actions to be taken on the endpoint 120 (e.g., via the actionable component 149) responsive to the determinations made by the decision/analysis components. For example, the application orchestrator 143 may report a detection of ransomware, an action determined to be taken responsive to the detection, and whether the action was successfully performed (e.g., to prevent or stop the ransomware) on an endpoint 120.

In some embodiments, the RPS 140 includes one or more decision/analysis components for detecting anomalous endpoint behavior indicative of a ransomware 125 attack and determining an action to be taken by the RPS responsive to the detection (e.g., based on the anomalous endpoint behavior). In some embodiments, the decision/analysis component(s) includes an AI analysis module 146 to execute one or more trained models to process behavior data collected from endpoint data sources 130 (e.g., by a monitoring module 141, in some embodiments) of an endpoint 120. At least some of the behavior data collected may be runtime behavior data, like data indicative of runtime conditions at the endpoint 120. The AI analysis module 146 may output one or more indications of whether endpoint behavior is anomalous. For example, the AI analysis module 146 may process obtained behavior data based on an endpoint profile that characterizes normal endpoint behavior to determine whether the obtained behavior data is indicative of a ransomware 125 attack on the endpoint 120.

In some embodiments, the decision/analysis component(s) includes a decision tree, state machine, or other data structure by which rules and criteria for actions may be applied based on one or more of behavior data and AI analysis 146 model output to determine whether ransomware is running on the endpoint and a responsive action. In some embodiments, a decision tree may work like a state machine where a set of outputs (e.g., of one or more models) of the AI analysis 146 module correspond to a given state, like a node, and changes in the set of outputs correspond to criteria by which rules are implemented to determine changes in state. In some embodiments, a state of the endpoint, such as that indicated by the decision tree 147 responsive to AI analysis 146 of endpoint behavior data output obtained by the monitoring module 141 corresponds to a classification of ransomware or anomalous activity on the endpoint. In some embodiments, the AI analysis 146 module utilizes a set of machine learning modules where each model in the set corresponds to one or more endpoint data sources 130 for which behavior data is processed by the model. In other words, a set of models may process a time slice of behavior data obtained by the monitoring module 141 from corresponding endpoint data sources 130, such as in parallel. In turn, the output of the AI analysis 146 may be, in some examples, a set of classifications output by respective models for corresponding endpoint data sources 130, and the set of classifications may be processed by the decision tree to determine endpoint system state. For example, the set of classifications may be processed as criteria against rules of the current state to determine whether state of the endpoint has changed (and to what state it transitioned to) or remains the same (and the determined state may have a corresponding state threat level by which malicious activity on the endpoint is classified). Thus, for example, the decision tree 147 classification may be a second stage of decision/analysis pipeline in which the AI analysis 146 corresponds to a first stage (which contains a set of models executed in parallel). In some example embodiments, a second stage may also be implemented as a machine learning model, like a neural network, that takes an input set corresponding to outputs from the set of models that each process a subset of data obtained from endpoint data sources in parallel.

In some example embodiments, criteria of one or more rules may be determined to be satisfied by behavior data in a preliminary analysis applied based on one or more current state or global rules. Some embodiments may determine whether rules for which criteria are satisfied correspond a predefined system state. For example, a change in one or more registry keys or an attempt to delete a file in a monitored directory may, depending on policy, correspond to a transition to a state with a critical threat level (e.g., detection of ransomware activity) for some endpoints but not others. Some use cases may apply rules to identify such activities to which the RPS 140 is to respond (and deeper evaluation need not be performed prior to taking action). In instances where preliminary analysis does not yield to immediate RPS 140 action based on the criteria or one or more rules that are determined to be satisfied (or not satisfied), the analysis may indicate whether or not further evaluation of the behavior data is to be performed (e.g., based on the rules) using a set of models for application to different subsets of the behavior data to obtain a set of outputs to be applied to a secondary set of rules for determining any changes to endpoint system state.

In some embodiments, rules for which criteria is satisfied indicate a decision to change state. For example, a node (or state) within a decision tree or state machine may be entered based on satisfaction of criteria of rules in one or more other nodes (or states) that point to that node (or state). The node (or state) which is entered may be associated with one or more rules that dictate whether system state remains at that node (or state) or transitions to a different node (or state) based on which criteria for which rules is satisfied. Thus, for example, a determination of system state may change depending on the current state and satisfaction of criteria of one or more rules associated with the current state. Satisfaction of criteria of one or more rules associated with the current state may indicate a transition to a next (or another) system state or may indicate that the current state has not changed. In some embodiments, one or more nodes or system state may be associated with a state threat level, such as NORMAL, SUSPICIOUS, WARNING, ATTENTION, or CRITICAL.

In some embodiments, depending on the security risk/impact of the endpoint 120 device on overall security, such based on privileges of the endpoint 120 within a network or system of computing device, an administrator may configure one or more of a sensitivity (e.g., of a policy, like low, medium or high) of one or more decision/analysis components to determining whether behavior of the endpoint is anomalous or to how aggressively action is to be taken responsive to anomalous behaviors. In some example embodiments, actions output or determined by the decision/analysis component(s) to be effectuated (or enforced) on the endpoint 120 in response to detection of ransomware 125 (e.g., based on detection of anomalous behaviors like data encryption with malicious intent, among other anomalous behaviors) may be effectuated (or enforced) by the actionable component 149.

In some example embodiments, the actionable component 149 may effectuate or enforce actions to be taken on the endpoint 120 to prevent, mitigate, or stop a ransomware 125 attack. For example, in response to detection of data encryption with malicious intent or other anomalous behavior, the actionable component 149 may stop one or several user-defined services or processes running on the endpoint 120. Additionally, a notification may be sent (e.g., as an email or a text) to a user (e.g., the IT manager or security administrator) to indicate the detection of a ransomware 125 attack (or other anomalous endpoint behavior). The actionable component 149 may, in some examples, effectuate (or enforce) actions that may include, but are not limited to, stopping all or some processes, stopping all or some processes corresponding to the anomalous behavior, stopping all or some process by which the anomalous behavior poses a security threat to the endpoint or other computer systems, notify an administrator, do nothing or, in some examples, may be configured to perform other actions such as locking the endpoint or disabling one or more network services (e.g., disabling a Virtual Private Network connection) or interfaces (e.g., one or more wired or wireless networking or communication interfaces of the endpoint, which may include but are not limited to ethernet, WiFi (e.g., 802.11), WiFi Direct, Bluetooth, etc). In some embodiments, the actionable component 149 may stop a malicious process or service and all related children processes or services. For example, the actionable component 149 may obtain a listing of processes, such as from the monitoring module 141, and one or more identifiers of anomalous processes (or services, some of which may be implemented by or associated with one or more processes) from the decision/analysis component(s). In some examples, a listing of processes structured by the monitoring module 141 may comprise hierarchical information corresponding to one or more processes, like information about whether a process is a child or parent of other processes, or otherwise related to one or more processes. In turn, in some example embodiments, if a process is identified as a malicious process, one or more other processes, like children or parent processes, like within a tree (which is not to suggest that a data structure conveying information about processes families need be a tree), may be identified, such as by recursively traversing a tree of processes within which a malicious process is identified (e.g., based on a process identifier). In some examples, recursion may be terminated upon reaching a root of a process tree or a process on a permit list.

Some embodiments of the actionable component 149 may maintain a permit list of processes, like a list of processes that are deemed safe to execute on the endpoint 120 (in some cases, regardless of whether anomalous behavior is detected, or may be based in part on what anomalous behavior is detected). In some example embodiments, a permit list may include processes corresponding to operating system, database, customer relationship management (CRM) system, other business application or other functionality of the endpoint. A permit list may ensure essential processes for the operating system and user operation of the endpoint stay intact when the RPS 140 takes action against malicious processes associated with ransomware 125 or other malware attacks. Logs which may contain information obtained by the monitoring module 141, information about anomalies and responses determined by the decision/analysis component(s) to those anomalies detected in information obtained by the monitoring module, and actions effectuated and enforcement of those actions by the actionable component 149 may be passed (e.g., periodically, upon detection of anomaly, or combination thereof) to the web client 145 for conveyance to a computing platform. In turn, a user of an endpoint 120 or administrator of one or more endpoints may access the information via the computing platform. Additionally, the information obtained by the computing platform from a plurality of endpoints may be processed to update one or more decision/analysis component(s) across one or more of the endpoints.

Example RPS Operation on Windows-Based Devices

In some embodiments, the RPS 140 may be deployed on an endpoint 120, like a x86-based endpoint, that executes a WINDOWS-based operating system. For example, an RPS 140 agent may executed on an endpoint 120 running Microsoft Windows Desktop or Server. Other example endpoints 120 may run all or some of Microsoft Windows functionality, such as via a Windows-based operating system, some examples of which may execute on IoT devices. Other examples may include, but are not limited to, RISC-based (or other endpoints) that execute a WINDOWS-based operating system that exposes some or all of the functionalities described below (which may include, but is not limited to, IoT devices, gaming consoles, mobile phones, tablets, etc.). Such examples of an endpoint may include one or more windows endpoint data source 130B, like a registry containing registry keys 137. Embodiments of the monitoring module 141 may interface with the operating system to perform real-time monitoring of a number of types of data or processes, examples of which may include endpoints data sources 130 and windows endpoint sources 130B.

Figure 2:
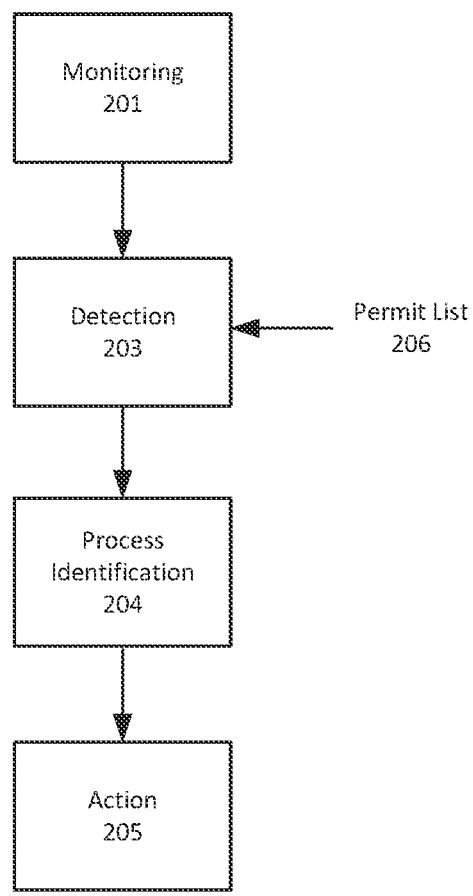
FIG. 2 shows an example flow chart illustrating operations for monitoring and containing ransomware in an endpoint with some example operating systems, in accordance with one or more embodiments.

As shown in FIG. 1B, and as described with reference to the example flow chart of FIG. 2, in some examples, a monitoring module 141 executing on one or more of the above noted operating systems may perform monitoring 201 activities. In some examples, the monitoring module 141 may monitor file system access and changes at a low operating system level on the endpoint 120. File system 131 monitoring, for example, may be implemented using a .NET class called "FileSystemWatcher" to obtain notifications of any changes made in specific directories (https://learn.microsoft.com/en-us/dotnet/api/system.io.filesystemwatcher?view=net-7.0, the contents of which are incorporated by reference in their entirety). The monitoring module 141 may configure a file system 131 monitor, like a FileSystemWatcher, to watch one or more directories specified at run time, which may be one or more specific folders and subfolders on the endpoint 120. The monitoring module 141, in turn, may monitor a console for resulting changes output by the FileSystem Watcher to the console. The monitoring module 141 may obtain, from the console, information about the identified changes in a monitored directory, such as changes in parameters like LastWrite and LastAccess time, creation, deletion, or renaming of files in monitored directories. The monitoring module 141 may generate, for each console change event, an entry within a data structure for processing by the RPS 140 (and by a computing platform). In some embodiments, the data structure may be a JSON structure, an example of which for a change event may have the form:

```
{
    "id": null,
    "data": {
        "Event": "CHANGED",
        "OldPath": null,
        "Path": "C: \\Users\\Oswaldo\\AppData\\Local\\Vivaldi\\User Data\\Default" },
    "date": "2020-04-15T21:05:40.8413063Z",
    "deviceDataType": "FILE_SYSTEM_EVENT",
    "deviceId": "00331-20308-43723-AA785"
}
```

In some examples, the monitoring module 141 may obtain information about running processes 132 on the endpoint 120. For example, the monitoring model 141 may determine which processes are currently running, processes that are starting, and processes that are stopping on the endpoint.

In some embodiments, the monitoring module 141 may continuously update a listing of all processes running on the endpoint, such as by capturing an initial list of running processes and updating the list based on every process that starts or stops on the endpoint 120 while the RPS 140 is executed. In some embodiments, the monitoring module 141 obtains an initial list of processes through a .NET class named "Process" that allows to obtain all the processes running on the endpoint 120. The obtained data may be used to generate an entry within a data structure for processing by the RPS 140 (and by a computing platform), like a JSON structure. An example of such a data structure for reporting on running processes may have the form:

```
"csname": "PROD",
"registeredUser": "Windows User",
"currentUser": "Administrator",
"corpUserIds": [ ],
"deviceId": "p8XTwKz45ipN3Eo1SaY4enCfG02zUZ7QV14NnJd7GvY",
"deviceDataType": "PROCESS_RUNNING",
"data": {
    "Processes": [
        {
            "ProcessID": 4924,
            "ParentProcessID": -1,
            "ProcessName": "conhost",
            "SessionID": 0
        },
        {
            "ProcessID": 5200,
            "ParentProcessID": -1,
            "ProcessName": "disp+work",
            "SessionID": 0
        },
        {
            "ProcessID": 2952,
            "ParentProcessID": -1,
            "ProcessName": "conhost",
            "SessionID": 0
        },
        {
            "ProcessID": 4708,
            "ParentProcessID": -1,
            "ProcessName": "mmc",
            "SessionID": 1
        },
        {
            "ProcessID": 3932,
            "ParentProcessID": -1,
            "ProcessName": "igswd",
            "SessionID": 0
        },
        {
            "ProcessID": 4128,
            "ParentProcessID": -1,
            "ProcessName": "sapstartsrv",
            "SessionID": 0
        },
        {
            "ProcessID": 3536,
            "ParentProcessID": -1,
            "ProcessName": "igsmux",
            "SessionID": 0
        }
        . . .
    ]
}
```

In some examples, the monitoring module 141 may obtain information about running processes 132 on the endpoint 120, which may include information about those processes which are currently running, processes that are starting, and processes that are stopping on the endpoint.

In some embodiments, libraries, like dynamic link libraries (DLLs) used by process executing on an endpoint 120 may be captured. For example, the monitoring module 141 may use the ManagementEventWatcher class to obtain information about DLLs used by processes executing on an endpoint. Additionally, commands or information about commands sent to a command line 136 interface of an operating system by a user or a process may be captured by the monitoring module 141. In some embodiments, command-line auditing is an extension within the Windows auditing and event system, which may be enabled, to add detailed command-line arguments used by a process to ID 4688 events in the Windows security event log. Thus, for example, the monitoring module 141 may use the EventLog class to observe Security Events logs in Windows, such as entries with ID 4688. In some embodiments, the monitoring module 141 may obtain information about changes in values of registry keys 137 using the wrapper class for RegNotifyChangeKey Value named RegistryMonitor. In some embodiments, the monitoring module 141 may obtain endpoint telemetry data 135, such as performance information including, but not limited to, CPU, Memory, and Network usage using performance counters. Additionally, the monitoring module 141 may obtain information about users (e.g., user accounts used, active user account, etc.), network interfaces, and operating system parameter, such as with class ManagementObjectSearcher.

Ransomware 125 attacks often originate from an external device, which in many examples is a Microsoft Windows machine that obtains access to files or database files and can copy or encrypt those files on an endpoint 120. The external device, which is often a remote device, may obtain accesses to the endpoint 120 for initiating a ransomware 125 attack via a network, like network 121, which may include the internet.

As an example, such as on an endpoint 120 running a Windows-based OS, ransomware 125 (or an attacker) might obtain administrator privileges on the endpoint 120 and set one or more directories as share points to be accessed from external Windows servers. A successful attack might proceed to extract or encrypt the data within the directories for the purpose of extracting a ransom. In either example, a ransomware 125 attack on an endpoint 120 may be stopped by preventing one or more processes from sharing the one or more directories so that the information (e.g., files, data) therein cannot be extracted (stolen) or encrypted. Other processes may also be stopped, such as processes to encrypt data or otherwise facilitate operations or access of the data subject to the attack.

In some example embodiments, one or more decision/analysis components of an RPS 140 may process endpoint behavior data obtained by the monitoring module 141 to detect 203 a ransomware attack. For example, a decision/analysis component may detect a change in permissions to access a directory, such as permissions corresponding to sharing that directory. In some examples, the change in permissions alone may not in itself warrant a response, but may correspond to a change in detected system state where a threat level may be elevated (e.g., from normal to suspicious or other). However, should a process or service attempt to extract files from the directory, or encrypt those files, which may be detected by a decision/analysis component in connection with the change in permissions, the decision/analysis component may output an indication of the detected ransomware activity. In another example, the decision/analysis component may detect a change in value of a registry key. Additionally, the decision/analysis component may monitor processes, command line requests, and DLLs used by processes to determine whether endpoint behavior is anomalous or has changed. In some examples, a permitted list 206 of processes may be used to determine whether anomalous behavior corresponds to processes other than those which are deemed permitted (e.g., such that activities of permitted processes do not arise to a detection). Thus, for example, embodiments may identify processes 204 corresponding to ransomware activity.

In some embodiments, an actionable component 149, for example, may take one or more actions 205 to respond to the detected ransomware activities. For example, the actionable component 149 may stop one or more processes indicated in an active list of processes that correspond to the malicious activity (e.g., like a process by which access to the directory is granted, process by which data is extracted from the endpoint, or process by which data is encrypted). Additionally, the actionable component 149 may prevent one or more processes, such as those that were stopped, among other processes in a set of services that may be operable to grant remote access, extract data from the endpoint, or encrypt data on the endpoint, etc. from starting (or restarting).

In some example embodiments, processes upon which action 205 is to be taken may be identified based on whether detection of malicious activity can be resolved to a specific process or set of processes. For example, a detection event may have associated therewith one or more specific Process IDs (PID) from a list of running processes that are determined to be executing malicious activity. In turn, an actionable component 149 may take action to kill a process tree corresponding to a specific PID. For example, the actionable component 149 may kill every process in the process tree corresponding to a PID identified as corresponding to malicious activities except any critical operation system process (e.g., a critical OS process that started the tree). Accordingly, in some examples, the action taken to kill a process may ensure that all process children are stopped as different PIDs can be doing different things providing information or accelerating an attack. In some other examples, a detection may not identify a specific PID associated with malicious activities, or an identified PID (which may be killed) may not cause anomalous behavior indicative of a ransomware attack to cease (e.g., a detection/analysis component may output a subsequent indication of detection after some action is already taken). In either case, action may be taken to kill all processes that are not part of the permit list 206 to ensure that any malicious processes running on the endpoint are killed (even when they are not specifically identifiable).

Example RPS Operation on Unix or Unix-Like Based Devices

In some embodiments, the RPS 140 may be deployed on an endpoint 120, like a x86-based endpoint, that executes a Unix based or Unix-like based operating system. Other examples may include, but are not limited to, RISC-based (or other endpoints) that execute a Unix based or Unix-like based operating system that exposes some or all of the functionalities described below (which may include, but is not limited to, IoT devices, gaming consoles, mobile phones, tablets, etc.). In some examples, the RPS 140 executes on an endpoint 120 running a Linux Server or Desktop operating system. In other examples, the RPS 140 may execute on an endpoint 120 running MAC OS, OS X, or iOS. Additionally, in some examples, the RPS 140 may execute on an endpoint 120 running Android OS. Such examples of an endpoint may include one or more Unix or Unix-like endpoint data sources 130A, like running services 134. Embodiments of the monitoring module 141 may interface with the operating system to perform real-time monitoring of a number of types of data or processes, examples of which may include endpoints data sources 130 and Unix or Unix-like endpoint sources 130A.

Figure 3:
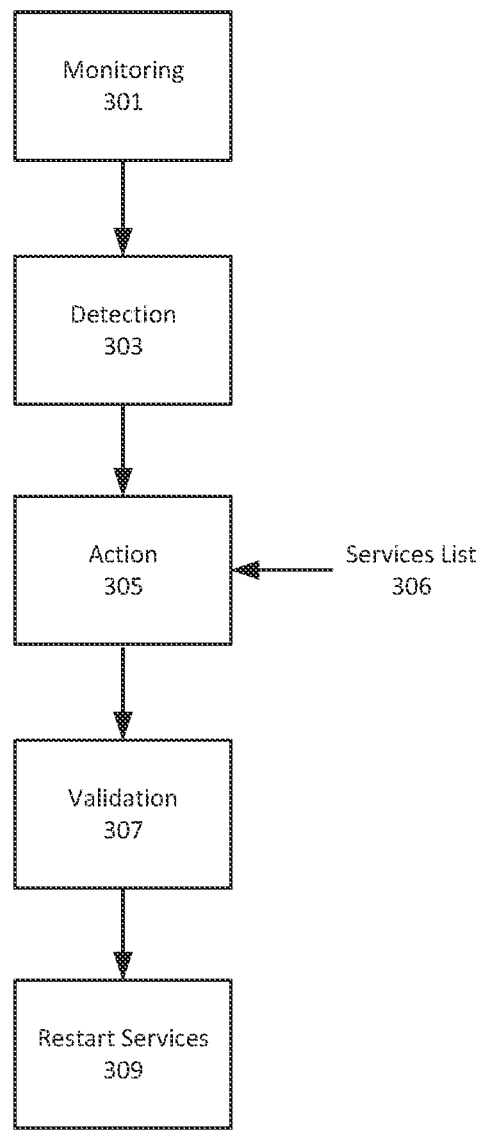
FIG. 3 shows an example flow chart illustrating operations for monitoring and containing ransomware in an endpoint with some other example operating systems, in accordance with one or more embodiments.

As shown in FIG. 1B, and as described with reference to the example flow chart of FIG. 3, in some examples, a monitoring module 141 executing on one or more of the above noted operating systems may perform monitoring 301 activities. In some examples, one or more monitoring activities may be performed in a substantially similar manner to those performed on Windows-based systems through implementation of a.NET platform on an endpoint 120. For example, monitoring on an endpoint 120 with a Linux desktop or server OS (among others, like Mac OS or iOS) may be performed by a monitoring module 141 with similar capabilities, code, and the like using a "Mono" platform, which is designed to allow developers to create cross platform applications as part of the .NET Foundation. The Mono platform, for example, provides an open source implementation of the .NET Framework based on the ECMA standards for C # and the Common Language Runtime. Thus, for example, the monitoring module 141 may implement functionality (or code) like that described above with respect to example .NET Framework classes to obtain information like that described above, e.g., endpoint behavior data from endpoints data sources like file system 131, running processes 132, OS information 133, telemetry data 135, and command line requests 136 to monitor 301 endpoint behavior.

In some examples, a monitoring module 141 executing on an endpoint 120 running an Android OS may monitor file system 131 access and changes at a low Operating system level using FileObserver API, such as to detect changes or modifications in one or more directories or files on the endpoint 120. In some embodiments, a list of running, starting, or stopping processes 132 may be obtained using WatchService. For example, the monitoring module 141 may obtain information about DLLs used by running processes. Additionally, as in other examples, the monitoring module 141 may obtain information about command line interface 136 requests, runtime telemetry data 135, OS information 133, and other information from other available endpoint data sources.

Ransomware 125 attacks often originate from an external device, which in many examples is a Microsoft Windows machine that obtains access to files or database files and can copy or encrypt those files on an endpoint 120. The external device, which is often a remote device, may obtain accesses to the endpoint 120 for initiating a ransomware 125 attack via a network, like network 121, which may include the internet.

As an example, such as on an endpoint 120 running a Mac OS, Linux, etc. OS, ransomware 125 (or an attacker) might obtain administrator privileges on the endpoint 120 and set one or more directories as share points to be accessed from external Windows servers. Such attacks, e.g., data extraction from an endpoint 120 running some OSs (examples of which may include Mac OS and Linux OSs) to the external device of an attacker, are in some cases more common than encryption of the data (which may be more common on endpoints running other operating systems). In either example, a ransomware 125 attack on an endpoint 120 may be stopped by preventing one or more services from sharing the one or more directories so that the information (e.g., files, data) therein cannot be extracted (stolen) or encrypted.

In some example embodiments, one or more decision/analysis components of an RPS 140 may process endpoint behavior data obtained by the monitoring module 141 to detect 303 a ransomware attack. For example, a decision/analysis component may detect a change in permissions to access a directory, such as permissions corresponding to sharing that directory. In some examples, the change in permissions alone may not in itself warrant a response, but may correspond to a change in detected system state where a threat level may be elevated (e.g., from normal to suspicious or other). However, should a process or service attempt to extract files from the directory, or encrypt those files, which may be detected by a decision/analysis component in connection with the change in permissions, the decision/analysis component may output an indication of the detected ransomware activity.

In turn, an actionable component 149, for example, may take one or more actions 305 to respond to the detected ransomware activities. For example, the actionable component 149 may stop one or more services indicated in an active list 306 of services that correspond to the malicious activity (e.g., like a service by which access to the directory is granted, service by which data is extracted from the endpoint, or service by which data is encrypted). Additionally, the actionable component 149 may prevent one or more services, such as those that were stopped, among other services in a set of services that may be operable to grant remote access, extract data from the endpoint, or encrypt data on the endpoint, etc. from starting (or restarting).

In some example embodiments, a user or administrator of an endpoint 120 may define which services should be stopped in response to detection of a ransomware 125 attack, such as via the web client 145 or via configuration of policy to be applied across one or more endpoints 120 through a computing platform. For example, in response to detection 303 of a ransomware attack, an actionable component 149 may take one or more actions 305 responsive to the policy to stop or prevent the attack based on the services list.

Some example embodiments of an actionable component 149 may stop one or more services 134 (or their constituent processes 132) in a soft and standard way, such as to enable restarting of a service (or process) without an exception, and revoking of access (e.g., by a service, process, or external device) to information or data sought to be extracted or encrypted by the ransomware 125 attack. The actionable component 149 may enforce one or more actions (which may include blocking execution of or stopping one or more services or processes) until the attack is contained, such as by a determination that access to the information or data by the ransomware 125 or an external device is revoked. An application orchestrator 143 may, for example, generate a notification to be sent to a user (e.g., the network or security administrator), to review the problem and do an analysis to assess the cybersecurity status of managed endpoints. In some embodiments, validation 307 is automated on the endpoint 120 by the RPS 140, such as by determining whether any information was successfully extracted or encrypted, and the determination may be conveyed to a computing platform for notification of the user or administrator to ascertain whether can safely continue operation without having to pay a ransom or disrupt operations any further.

Once an administrator is confident an endpoint 120 can share data again, without compromising any information, the administrator may cause a computing platform to send a notification to the endpoint that indicates whether one or more services or processes upon which the actionable component 149 took or is taking action are permitted to be restarted 309.

Training Machine Learning Models for RPS Deployment

As described above, an example computing platform 110 may permit multi-tenants to have access to their own data, such as tenant specific policies, reporting, etc., while affording shared access of endpoint behavioral data by which an AI model training sub-system 117 generates models for deployment to RPS 140 instances executing on endpoints 120. Database 115, for example, may store collections of endpoint behavior data, like training data sets, for training neural network algorithms across multiple customers to provide improved protection by leveraging shared acquired intelligence.

Example embodiments of the training module 117 may employ a variety of different machine learning techniques to generate models for deployment. Embodiments may utilize supervised, unsupervised, or semi-supervised machine learning algorithms, or in some examples, a combination of such techniques, to train machine learning models to detect ransomware 125. In some embodiments, the training module 117 may use supervised or semi-supervised learning to derive one or more models. Supervised learning may employ a subset of machine learning tasks for deriving a model that maps a set of input to an output based on sample (e.g., labeled) input-output data. Semi-supervised techniques may also be used, which may use some labeled input-output data and also unlabeled data for training. In either case, the computing platform 110 may push one or more derived (e.g., trained) models to endpoints 120 executing an RPS 140 instance. In some examples, which model is pushed to which endpoint 120 may depend on a device type and OS running on the endpoint. Embodiments of the training module 117 may generate one or more different models with respect to different device type and OS combinations. Additionally, some embodiments may generate models with even greater granularity, such as based on applications running on or functionality provided by different endpoints. Thus, for example, endpoint behaviors that may be anomalous on some endpoints but correspond to normal operation on other endpoints may be correctly classified by respective models deployed to different subsets of endpoints.

Some example embodiments of the training module 117 may train classes of lightweight (e.g., "micro") neural networks that are less resource intensive than other classes of neural networks. Micro neural networks (which may also be referred to herein as neural networks, which is not to suggest that those networks must be micro neural networks, or that use of other neural networks is disclaimed) are expected to afford RPS 140 functionality to endpoints which may be resource constrained, whether by processing power or by power consumption (e.g., battery life), compared to other neural networks. Example supervised learning algorithms that may be employed to train such models may include, but is not limited to Light Gradient Boost Machine (Light GBM), XGBoost, convolutional neural networks, recurrent neural networks, random forests, logistic regression, or K-means (which is not to suggest that other techniques described herein are not applicable, or that other examples of neural networks described herein cannot afford similar benefits).

Some embodiments may employ one or more of the above techniques to a model within a set of models for processing a subset of behavior data monitored by the RPS 140 on an endpoint 120. Other models within the set of models may process other subsets of behavior data monitored by the RPS 140 on an endpoint 120. Embodiments of the RPS 140, as described above, may execute a set of models in parallel to process subsets of behavior data collected from a variety of endpoint data sources on an endpoint. Some embodiments may train the respective models using restive training data sets. For example, using each set of training data, the training module 117 may apply one or more machine learning algorithms to train a different model. The set of decisions, e.g., classifications, output by the respective models in the set may be evaluated in combination at an endpoint to determine if ransomware is acting, present or executing in the system.

In some example embodiments, the database 115 may store raw behavioral data reported by various endpoints. Some example embodiments may segment the behavioral data, such as based on system information (e.g., like OS information) reported by the respective endpoints, which may be indicative of a device type and operating system utilized by various endpoints, such that behavior data may be aggregated for similar endpoints. Some embodiments may further segment behavior data for similar endpoints, such as for different endpoint data sources monitored by the RPS. Some examples may segment behavior data with even greater granularity, such as based on applications used on or functionality provided by different subsets of endpoint devices that may otherwise be similar. Such segmentation may, for some endpoint data sources, to provide for training of more granular models on the respective data sets, reduce false positives in classifications output of those models for respective subsets of endpoints relative to use of a single model.

Some embodiments of the computing platform 110, such as via the orchestration engine 113, may periodically process behavior data obtained from endpoints 120 to extract segments of behavior data for identification to a training data set for training one or more models. In some examples, the orchestration engine 113 may execute extraction code at a specified interval (e.g., once a week), or based on a user-defined trigger (e.g., no. of ransomware detection misses exceeding a specified threshold), or even manually to update training data sets for training of models by the training module 117. The number of training records generated can vary (e.g., range from zero new records to over a million). In some embodiments, the computing platform 110 may store information about the extraction such as how long it took, number of records extracted, or number of records in the database 115. For example, the orchestration engine 113 may store data extraction information in a .json file. This may allow an administrator or process to determine, such as based on a number of new records identified to training data sets, whether to initiate a training iteration to update one or more models via the training module 117 or whether to cause the computing platform 110 to push one or more such updated models to RPS 140 instances for monitoring of endpoints.

As described above, the RPS 140 (e.g., via monitoring module 141) captures behavior data for different categories (e.g., sources) of endpoint system behavior and activities. This data is used to train separate models, such that a given model may process a respective subset of data to detect anomalous behavior within an endpoint data source (or sources), and outputs of a set of models that evaluate respective subsets of behavior may be evaluated to determine current endpoint system state. Example categories of data captured may include one or more of, but are not limited to:

OS_INFO—Operating system information.

PROCESS_EVENT—Events about starting or stopping of processes.

PROCESS_RUNNING—Processes/applications that are running in the system (e.g. firefox, Ec2config, CRM software, database software, etc.).

REGISTRY_KEY_EVENT—Operating system registry information.

FILE_SYSTEM_EVENT—File system operations like move, write, create and deletion.

MODULE_EVENT—All the DLLs (dynamically linked libraries) being accessed by running processes.

COMMAND_LINE-All the commands being executed from users or processes in the operating system.

In the event new data has been extracted, such as to augment training data sets within the database 115 for model training, a data parsing procedure may be applied to identify the different categories (e.g., subsets of behavior data) within the data reported to the computing platform by endpoints 120. When the parsing is done, behavior data may be segmented based on category. For example, each category may be stored in a type of object known as a DataFrame which enables using a Python pandas library to process the data, which may facilitate an insertion process in some embodiments. In some embodiments, a parsing procedure is carried out in a parallelized way to speed up the processing since the amount of data that is generated (e.g., on a weekly basis) may be large (e.g., behavior data obtained from hundreds, thousands, or hundreds of thousands or more endpoints 120 that execute an RPS 140). A check may be performed to identify the number of categories, ncat, and then an operating system thread may be assigned to parse the information of each individual category. So, there may be ncat threads working in parallel to parse the learning data. In addition to segmentation by category, other segmenting schemes may be applied to obtain more granular training data sets, such as based on one or more of device type, reported operating system, applications running on an endpoint, endpoint functionality, and the like. In some examples, a category may be selected for further segmentation of behavioral data for one or more factors like those discussed above based on a rate of false positive classifications output by a model during validation.

As described above, some embodiments may implement an insertion process to covert DataFrames to JSON data for training of one or more models, which is not to suggest that other data structures may not be used in training operations. For example, once all the data is stored in an object of type DataFrame, the computing platform 110 may insert the data in a new target MongoDB database instance (e.g., database 115 may comprises a collection of databases storing different portions of data used by the computing platform). This may be done using insert functions available in the Pymongo library. In some embodiments, a RecordIndex is added to the JSON records to indicate a schema of record data for training of machine learning models by the training module 117.

In some embodiments, the AI model training sub-system 117 trains a number of different models, e.g., one for each category type, or a combination of category types, where each category may correspond to an endpoint data source (which is not to suggest that some embodiments may not combine output of a subset of endpoint data sources into a combined endpoint data source for reporting or training). In some embodiments, for example, a processes model may be trained on a training data set comprising records based on behavioral data from PROCESS_EVENT and PROCESS_RUNNING categories. Accordingly, example category types may include, but are not limited to, registry keys, file system, modules (DLLs), processes running, process event, command line, etc., from available data sources on endpoints 120 that are monitored by RPS 140 instances. Thus, a registry model may be trained using data from REGISTRY_KEY_EVENT category, file system model from FILE_SYSTEM_EVENT, and so on, in some examples. Such an architecture can facilitate the addition of new category types in the future without a requirement to update every, or even most models, in a set of models employed by the RPS 140 for a set of monitored endpoint behavior data sources.

In some embodiments, each model may be trained separately using a code to perform collection, extraction, parsing, storing and training. If it is the first time a training is performed, a model may be created by training with training data records obtained for the category. The model and a training log file may be generated based on the training data records (e.g., a training set within the training data records, which may contain all or a portion of the records, as some examples may retain a set of records, like a validation set, for validation of the model). The training log contains information about the training date and training performance, in order to have a record of currently model state and efficacy by upon which decisions to deploy the model may be based. Embodiments may iteratively train models, such as over time as behavioral data is collected from endpoints. For example, an instance, like a current instance, of a model may be loaded and trained based on new records identified to the training records, and may be validated based on the new records. In some example embodiments, if the amount of training data records is greater than the amount of data records used for training in the previous training, the model may be trained only with the new records, and otherwise the model may not be trained (e.g., until a threshold number of new records are obtained). Other embodiments may implement different thresholds or train and validate on combinations of new and historical records.

In some embodiments, an example training operation using a supervised learning algorithm implementation may employ a LightGBM (LGBM) framework (which is not to suggest that training operations may not be semi-supervised, such as by using labeled and unlabeled data, or that other machine learning techniques described elsewhere herein may not be used to train embodiments of models). In some embodiments, LGBM is a gradient boosting framework that uses tree-based learning algorithms where its operations scale a mixture of binary and continuous characteristics. Resulting models may be distributed, efficient, and have one or more of the following advantages over other applicable models (which it not to suggest that use of other models is disclaimed, or other tradeoffs exist), such as faster training speed and higher efficiency, lower memory usage, improved accuracy, support of parallel, distributed, CPU and GPU learning, capable of handling large-scale data, and capable of handling categorical features.

Some embodiments of LGBM may use a leaf-wise tree growth algorithm to improve convergence speed. One downside of such a technique is that leaf-wise growth may overfit data without application of appropriate parameters. Some embodiments may mitigate overfitting to improve results using a leaf-wise tree by selection of parameters like:
  num_leaves—to control the complexity of the tree model.
  max_depth—Limit of tree depth
  min_data_in_leaf—Parameter to prevent over-fitting in a leaf-wise tree.
  max_bin—maximum number of bins that features will be bucketed into.
  num_iterations—number of boosting iterations (trees to build). The more the number of trees built the more accurate the model can be (e.g., at the cost of longer training time and may be higher chance of overfitting).

Embodiments may turn model performance by selecting appropriate parameters. The success of a learning model may depend on the selection of the best parameters that give the best possible results. In this case, the parameters of the LGBM algorithm mentioned above may be tuned to ranges that provide best possible results. For example, some embodiments may test different combinations of parameter values and evaluate trained model performance based on a set of validation records within a training data set and other metrics (e.g., processing efficiency, memory usage, etc.), such as to satisfy an objective function to balance tradeoffs where they may exist, like model performance against processing efficiency and memory usage for different endpoints. In other words, some embodiments may learn an optimal parameter set for training a model to be deployed on a given subset of endpoints, or even a specific endpoint. In some examples, parameter optimization may be looked at in terms of a search algorithm, which walks through a space of parameters and hunts down a set of parameters that leads to a trained model whose performance best satisfies an objective function.

Whenever new records are added to the existing training data, operating like those discussed above (or elsewhere herein), including preprocessing steps, may be iterated before training a machine learning model. This may be a resource prohibitive or time-consuming process.

An alternative to this may include implementing a machine learning pipeline. In some embodiments, a machine learning pipeline implements a set of preprocessing steps or training activities. For example, whenever new data is introduced, the machine learning pipeline may performs the steps as defined and use a machine learning model to predict target variables. In some examples, such a pipeline may sequentially apply transforms and evaluate results based on output of a final estimator (e.g., like an objective function). Intermediate steps of the pipeline may implement fit and transform methods while the final estimator may only implement fit.

As an example, in some embodiments, a machine learning pipeline may be employed to decrease time to deployment of updated iterations of a model. For example, a training model (or one or more models in a pipeline) may learn preprocessing steps and search strategy for determining an optimized parameter set for LGBM algorithms for generating a trained model whose performance maximizes (or minimizes) an objective function. In some embodiments, a training model may even learn to determine the objective function for evaluating model performance based on endpoint characteristics (e.g., battery health, amount of memory, processor speed, processor cache, etc.).

In some embodiments, as part of a training process, data analysis for re-labeling is performed to determination a classification for all events corresponding to training records, e.g., whether a record is associated with malicious or non-malicious activity. For example, records based on behavioral data obtained from endpoint devices known to be infected with ransomware or subject to a ransomware attack may be classified as indicative of malicious (e.g., ransomware) activity. Some embodiments may classify only those records containing behavioral data for a period the endpoint was affected by ransomware may be classified as indicative of malicious activity. In some embodiments, behavioral data obtained from endpoint devices known to not be infected with ransomware or subjected to a ransomware attack may be classified as indicative of non-malicious (e.g., normal or healthy) activity. In some embodiments, a process classifies records as no-ransomware for all events (e.g., a false positive detection) that can be found in a non-compromised endpoint. Additionally, embodiments may generate training records to label as no-ransomware based on behavioral data obtained from endpoints regardless of any specific false positive detection. It is expected that example labeling operations like those outlined above may minimize false positives and truly identify ransomware events.

In some embodiments, if a detection event corresponds to a false positive detection of ransomware activity, endpoint behavioral data corresponding to the event may be obtained for generating training records to contextualize those non-malicious activities. Embodiments may obtain and label records comprising behavioral data corresponding to the false positive detection event as non-malicious (e.g., no-ransomware) and iterate one or more training operations to retrain one or more machine learning models that caused or contributed to the false positive. After retraining (e.g., updating of a model), the updated model (or updated parameters) may be passed to the API of the computing platform and pushed to one or more endpoint devices for updating a corresponding model within RPS 140.

In some embodiments, some (or all) endpoints 120 may receive their own specific versions of one or more machine learning model that are trained on endpoint specific behavioral data obtained by the computing platform 110 from the RPS 140 instance executing on the endpoint. In some embodiments, an initial version of a model provided to an RPS 140 on an endpoint 120 may be trained based on behavioral data of similar endpoints and iteratively updated as behavioral data is obtained from the RPS 140 over time. Embodiments of example training processes described herein may segment behavior data for training in a variety of ways as outlined above. Some embodiments (either by the RPS 140 or by the computing platform 110) may associate obtained behavioral data with a DeviceID corresponding to the endpoint 120 on which the RPS 140 executes. Thus, for example, behavior data associated with a DeviceID may be used to populate at least some records within training data used for training models for a specific endpoint reported to the computing platform 110 by the RPS 140 as having that DeviceID. In turn, an endpoint 120 may receive a unique set of models trained to detect ransomware when executed by an RPS 140 on that specific endpoint. With behavior-based on a significant amount of time (e.g., several weeks) established, anomalous activities of the endpoint 120 may be detected by the PRS 140 based on behavior data obtained from monitored endpoint data source and stopped by using one or more containment actions available to the RPS.

Learning Malicious Process Names

Once a ransomware attack is detected, a process or service name associated with detection of anomalous activities in behavior data obtained from monitored endpoint data sources may be indicated by an RPS 140 as the initiator of that specific ransomware attack on an endpoint 120. In some examples, information about the specific processes or services and behavior data may be sent to the computing platform 110. The computing platform 110 may, upon determination that one or more processes or services correspond to ransomware or a ransomware attack, the computing platform may push, via the API, an identifier of a process or service to be added to a block list on other endpoints 120 that are being monitored by the RPS platform.

As a first step, the process or service information and behavior data may be identified to other endpoint devices associated with the same user (or customer) in near real-time for addition to block lists. Next, when a process or service is validated as malicious by an administrator (e.g., security administrator), it and any other associated information may be identified to other users/customers for addition to their block lists. Accordingly, malicious activities associated with specific ransomware processes may be prevented by stopping a process or service as soon as it tries to run (e.g., using preliminary rules applied to running process or service information) even if a process or services is launched multiple times and/or on multiple devices.

Learning Malicious File Extensions

In some ransomware attack scenarios, a specific process or service, such as one that started an encryption process or service may not be identifiable. However, in some example scenarios an extension of malicious files or malicious extension of encrypted files may be identified. For example, ransomware attackers may attempt to encrypt files and store the encrypted files with a specific extension. To avoid false positives, the decision/analysis component within the RPS 140 on an endpoint 120 may monitor for a specified number of files (e.g., for up to 5 files) to be encrypted with a malicious file extension (e.g., within a threshold period of time) to classify it as an attack as opposed to the very first file to be created with that specific extension. Some embodiments may apply other rules to classify detection involving fewer files (e.g., 1 file, or less than 5), such as based on specific monitored files, extensions of the files prior to encryption, size of the files, or other factors.

In some embodiments, once a file extension used by ransomware or in a ransomware attack is detected and identified by an RPS 140, it may automatically update a rule and report information about the rule and malicious extension to the computing platform for distribution in near real-time to one or more other endpoints 120 with the RPS 140 so that a decision/analysis component, like a decision tree on each endpoint may be updated with the updated rule to respond to similar attacks. That way, regardless of the containment method used on different endpoints, as soon as one file is detected with this malicious extension, one or more processes or services may be stopped to prevent those encryption activities of ransomware. Thus, an attack may be minimized with the smallest possible impact on endpoint devices running the RPS that are managed by the customer or administrator and under threat from the attack. In some use cases, the extension may be validated as malicious by an administrator (e.g., security administrator) and shared with other customers in association with one or more updated rules for preventing a similar attack on endpoints of the other customers that execute the RPS.

Ransomware Behavior Emulator

In some embodiments, a ransomware behavior emulator may be deployed to one or more endpoints as an executable program that may be executed by the endpoints to generate ransomware behavior at the end-point level, such as to validate if any security implemented is satisfactory (e.g., satisfies a specified condition) and may stop a similar ransomware attack. Embodiments of the emulator may be not flagged by an anti-virus (AV) as ransomware such that the emulator may simulate zero day-attacks. A configuration file of the emulator may be modified to specify which ransomware behavior to execute and what files are targeted, such as to emulate an encryption attack on those files via one or more encryption processes or services. Other example may include, but are not limited to, simulating DLL modifications, exfiltration of data, simulating command line request, and modification of registry keys. Each time the emulator executes an action, a user interface may be generated by the emulator to indicate to a user that the emulator is running and whether or not the execution of those configured behaviors were successful. Associated information from the emulator and behavior data and any detections and actions taken by the RPS 140 may be sent to the computing platform for updating one or more models for detecting simulated malicious activities.

Data Collection About Ransomware Behavior

In some embodiments, actual ransomware executable examples are used to generate ransomware behavior data for supervised learning at a later stage. To create training data, manual intervention may be required to mark the beginning and end of ransomware execution. However, in some embodiments, training data may also be created automatically by the system without manual intervention. Some example embodiments may create a clone of a virtual machine that has an RPS instance installed. The clone virtual machine may be run in an isolated and protected network to prevent the ransomware from spreading and causing real harm to a network or connected machines. Embodiments of the process may ensure that the RPS instance on the clone is running and in 'normal' state to ensure proper data collection prior to uploading a ransomware sample to the virtual machine. In some cases, a process may verify that the sample has an '.exe' extension to allow execution of the ransomware code in a future step. If not, the extension may be changed to '.exe'. Some embodiments of the processes, such as those performed on a Windows-based OS may change a registry key or flag "Ransomware_flag" from the value of "NO" to "YES" to indicate to the RPS 140 (or computing platform 110) that the data collected from the Windows-based operating system is ransomware behavior data. The ransomware sample may be executed on the clone and the RPS 140 may obtain behavioral data from monitored endpoint data sources. The execution may take several minutes until results are observed, which could include the encryption of files in the system, change of wallpaper, creation of registry keys, ransomware notes among other observables. Machine behavior data collected by the RPS 140 may be conveyed to the computing platform 110 over the course of the simulated attack. The collected data may also be stored locally on the virtual machine in a known location that is known not to be encrypted by the ransomware. Once the ransomware process finishes, a process may set the "Ransomware_flag" with the value "NO" to indicate the end of ransomware behavior. In turn, the virtual machine may be spun down, and the clone file is deleted, finishing the data collection. Some embodiments may execute a process like that described above for over 1000 families of ransomware and more than 5500 different ransomware executables to collect a wide variety of ransomware behavior data, and the process may be executed on different types of endpoint devices or for different operating systems. The resulting data may be used to bootstrap populating of training record datasets with records associated with behavioral data corresponding to malicious activities on endpoint devices.

Source Code Security

In some embodiments, when code has been compromised by a valid user it may not be possible to detect if a new backdoor or line of code that might compromise access has been added maliciously. When new code is submitted to a validation process, it may be compared to known secure code to determine whether it is changed from a security administrator validated one. If it is changed, a machine learning model or antivirus may be used to scan the code to look for any backdoors or potential malicious code that was added. In some embodiments, information about any detected backdoors or potential malicious code, or information about the code if no threats are detected, may be stored in a database (e.g., of the computing platform) to be used for reports and display information to a user or administrator. Additionally, in some embodiments, the information may be used to train a machine learning model, such as in accordance with techniques described herein, to be able to identify new code and possible threats within it.

In some embodiments, the various systems, modules, components, services, or functions described herein may include or be implemented using one or more computing devices that are programmed to perform the functions described herein. The computing devices may include one or more electronic storages, one or more physical processors programmed with one or more computer program instructions, and/or other components. The computing devices may include communication lines or ports to enable the exchange of information within a network or other computing platforms via wired or wireless techniques (e.g., Ethernet, fiber optics, coaxial cable, Wi-Fi, Bluetooth, near field communication, or other technologies). The computing devices may include a plurality of hardware, software, and/or firmware components operating together. For example, the computing devices may be implemented by a cloud of computing platforms operating together as the computing devices.

Figure 5:
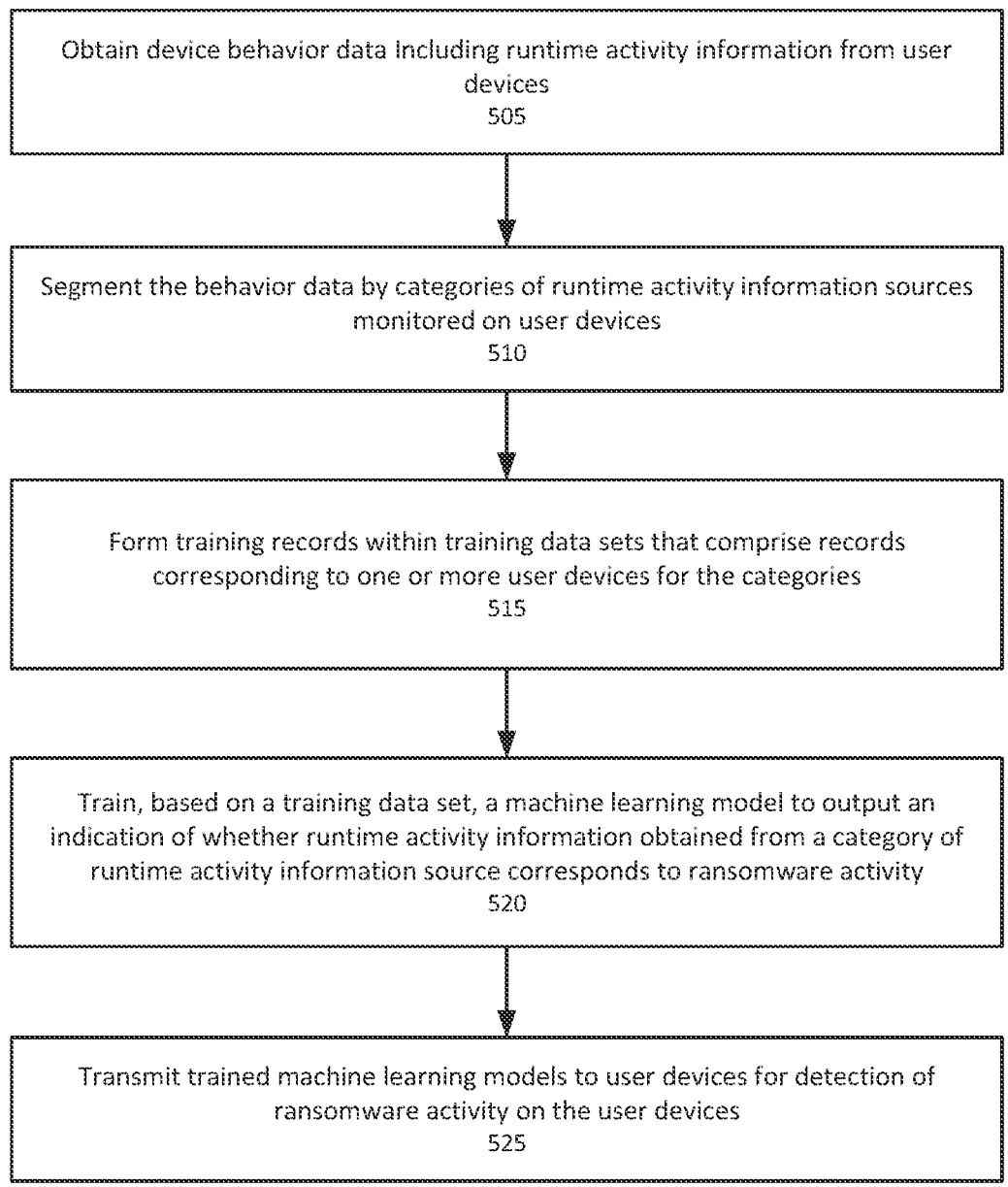
FIG. 5 shows an example flow chart illustrating operations for training one or more models to detect ransomware at an endpoint, in accordance with one or more embodiments.

FIG. 5 shows an example flow chart illustrating operations of a process 500 for training one or more models to detect ransomware at an endpoint, in accordance with one or more embodiments. Embodiments of the process 500 may be executed within the context of example environments 100 described with reference to FIGS. 1A and 1B using techniques described with respect to FIG. 4, among others, upon a computing device or collection of computing devices like those described with reference to FIG. 6.

In some embodiments, the process 500 comprises obtaining 505 device behavior data, which may include runtime activity information corresponding to user devices, like endpoints on which a ransomware protection service is deployed. Behavior data may be obtained in a variety of different ways. For example, some behavior data may be obtained from a user device on which ransomware activities are simulated. In some examples, behavior data may be obtained from a device or virtual machine on which actual ransomware is executed, such as to obtain information about the behaviors of the ransomware. In some examples, behavior data may be obtained from normally functioning user devices, such as to obtain information about nominal device behaviors. In some examples, device behavior data is obtained from a plurality of user devices. Runtime activity information corresponding to a user device may include information from one or more data sources monitored on user devices on which ransomware protection services are deployed. Thus, for example, the behavior data may contain reported information about one or more processes or services, operating system, registry, file system, etc. that may be monitored or collected while user devices are running, such as to detect changes in values and other runtime activities on user devices.

In some embodiments, device behavior data may be segmented 510 by category of runtime activity information sources that are monitored across user devices from which the behavior data was collected. In other words, a category of behavior data may be parsed from other behavior data corresponding to other categories to obtain a segment of behavior data that corresponds to one or more target runtime activity information sources. For example, a segment of behavior data containing runtime activity information corresponding to processes or services on an endpoint may be obtained. In some examples, such as for processes, a category may include information about process running and process events (which in some embodiments may be distinct runtime activity sources, but may be categorically related for generating a model, which is not to suggest that two categories cannot be used or a category may be formed to include two or more runtime activity information sources, or even subsets of behavior data from those sources, where such combinations yield to training models that improve detections or reduce false positives). The segmentation of the behavior data by categories of runtime activity information sources monitored on the user devices may, in some embodiments, be performed to obtain a plurality of by-category training data sets of respective subsets of behavior data for training models apt to detect anomalous or malicious activities, like ransomware activities, based on runtime activity information obtained from respective information sources that are monitored on user devices.

In some embodiments, training records are formed 515 within the training data sets. Each training data set may comprise training records corresponding to one or more user devices for the respective categories. For example, a plurality of records may be formed in a training data set based on behavior data corresponding respective user devices. A first subset of the records in the training data set may be labeled as malicious based on indications of a subset of user devices affected by ransomware and a second subset of the records being labeled and non-malicious based on indications of another subset of user devices not affected by ransomware. In some example, the first subset and second subset of records may comprise records corresponding to a same user device, such as where the user device was affected by ransomware over some period of time but not another, or simulation of ransomware activities or testing of actual ransomware on a sandboxed virtualization of the device (or the actual device) was performed, and in some examples, the second subset of records may comprise records corresponding to false positive detections for which associated device activity is reclassified as not ransomware.

In some embodiments, a machine learning model is trained 520 to output an indication of whether runtime activity information obtained from the category of runtime activity information source corresponds to ransomware activity. For example, a machine learning model may be trained on a training data set comprising behavior data corresponding to a category of runtime activity information source, such as upon training records formed within the training data set. In some examples, a subset of records is selected for training. The subset of records may correspond to a user device on which the trained model is to be deployed and selection may be performed based on a device identifier associated with one or more records to be identified to the subset. In some examples, the subset of records may correspond to a collection of user devices sharing a device type and operating system, or even finer grained shared similarities. Additionally, embodiments of step 520 may comprise training a collection of models for deployment as a set of models to one or more user devices. For example, a set of models may be trained on respective training data sets for a respective set of categories of runtime activity information sources. Thus, for example, the set of models may be deployed on a user device for execution by a ransomware protection service to monitor the different categories of runtime activity information sources with respective models trained to identify anomalous or malicious activities indicative of ransomware for a corresponding category of runtime activity information sources monitored on the user device.

In some embodiments, the process 500 may transmit 525 one or more trained machine learning models to one or more user devices for detection of ransomware activity on the user devices. In some examples, a machine learning model and at least one other machine learning model for another category of runtime activity source to at least some of the user devices. In some examples, models trained based on subsets of records comprising at least some records having a same device ID are transmitted to a user device reporting that device ID. In other words, some models may be trained specific to a given user device and transmitted to the user device for which they were trained. A plurality of such sets of models may be trained with respect to a plurality of user devices on which instances of a ransomware protection service is deployed to apply the models to obtained data, like behavioral data, monitored at runtime for activity information sources available on different user device. In some embodiments, each of the at least some user devices execute a set of machine learning models to monitor a set of runtime activity information sources for ransomware activity.

Figure 6:
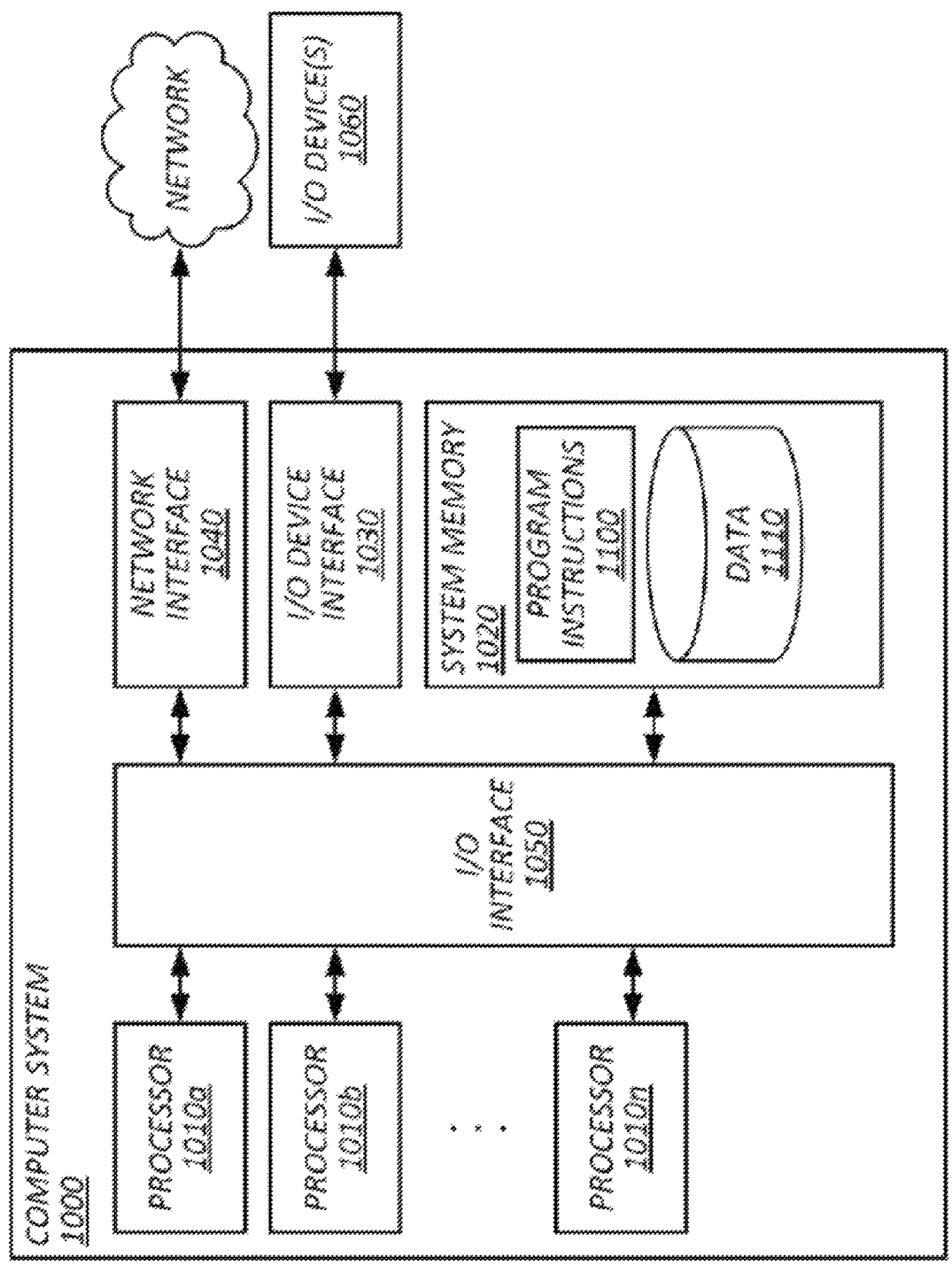
FIG. 6 is a physical architecture block diagram that shows an example of a computing device (or data processing system), in accordance with one or more embodiments.

FIG. 6 is a physical architecture block diagram that shows an example of a computing device (or data processing system) by which some aspects of the above techniques may be implemented. Various portions of systems and methods described herein, may include or be executed on one or more computer systems similar to computing system 1000. Further, processes and modules or subsystems described herein may be executed by one or more processing systems similar to that of computing system 1000.

Computing system 1000 may include one or more processors (e.g., processors 1010a-1010n) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010a), or a multi-processor system including any number of suitable processors (e.g., 1010a-1010n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus may also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010a-1010n) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 1050 may be configured to coordinate I/O traffic between processors 1010a-1010n, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Similarly, reference to "a computer system" performing step A and "the computer system" performing step B may include the same computing device within the computer system performing both steps or different computing devices within the computer system performing steps A and B. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively. Computer implemented instructions, commands, and the like are not limited to executable code and may be implemented in the form of data that causes functionality to be invoked, e.g., in the form of arguments of a function or API call. To the extent bespoke noun phrases (and other coined terms) are used in the claims and lack a self-evident construction, the definition of such phrases may be recited in the claim itself, in which case, the use of such bespoke noun phrases should not be taken as invitation to impart additional limitations by looking to the specification or extrinsic evidence.

In this patent, to the extent any U.S. patents, U.S. patent applications, or other materials (e.g., articles) have been incorporated by reference, the text of such materials is only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

What is claimed is:

1. A non-transitory machine-readable medium storing computer-program instructions that when executed by one or more processors effectuate operations comprising:
   a. obtaining, with one or more processors, device behavior data from a plurality of user devices, the device behavior data includes runtime activity information associated with respective user devices;
   b. segmenting, with one or more processors, the device behavior data by categories of runtime activity information sources monitored on the user devices to obtain a plurality of by-category training data sets;
   c. forming, with one or more processors, a plurality of records in a training data set based on the device behavior data corresponding respective user devices, a first subset of the records being labeled as malicious based on indications of a subset of user devices affected by ransomware and a second subset of the records being labeled as non-malicious based on indications of another subset of user devices not affected by ransomware;

d. training, with one or more processors, based on the training data set, a machine learning model to output an indication of whether runtime activity information obtained from the category of runtime activity information source corresponds to ransomware activity; and e. transmitting, with one or more processors, the machine learning model and at least one other machine learning model for another category of runtime activity source to at least some of the user devices, wherein each of the at least some user devices execute a set of machine learning models to monitor a set of runtime activity information sources for ransomware activity.

2. The medium of claim 1, wherein obtaining device behavior data from a plurality of user devices comprises:
obtaining the device behavior data from user devices executing a ransomware protection service that monitors runtime activity information sources on the user devices.

3. The medium of claim 2, wherein:
the device behavior data is reported by respective ones of the user devices executing respective instances of the ransomware protection services to report runtime activity information associated with respective ones of the user devices.

4. The medium of claim 1, wherein obtaining device behavior data from a plurality of user devices comprises:
obtaining at least some device behavior data from the subset of user devices affected by ransomware.

5. The medium of claim 4, wherein obtaining at least some device behavior data from the subset of user devices affected by ransomware comprises:
simulating ransomware activities on one or more of the at least some user devices.

6. The medium of claim 4, wherein obtaining at least some device behavior data from the subset of user devices affected by ransomware comprises:
running ransomware on one or more of the at least some user devices; and
classifying behavior data collected from the one or more of the at least some user devices as malicious.

7. The medium of claim 6, wherein running ransomware on a user device comprises:
provisioning a virtual machine based on characteristics of the user device;
executing the ransomware on the virtual machine to obtain behavioral data indicative of ransomware activities on the user device if the ransomware is running on the use device.

8. The medium of claim 4, wherein obtaining at least some device behavior data from the subset of user devices affected by ransomware comprises:
detecting, by a ransomware protection service executing on one or more of the at least some user devices, ransomware; and
classifying behavior data collected from the one or more of the at least some user devices as malicious based on the detection.

9. The medium of claim 1, wherein segmenting the behavior data by categories of runtime activity information sources monitored on the user devices to obtain a plurality of by-category training data sets comprises:
parsing the obtained behavior data by a plurality of different categories of runtime activity information sources that are monitored on different ones of the user devices.

10. The medium of claim 1, wherein segmenting the behavior data by categories of runtime activity information sources monitored on the user devices to obtain a plurality of by-category training data sets further comprises:
segmenting by user device type to obtain a plurality of by-category training data sets for different device types.

11. The medium of claim 1, wherein segmenting the behavior data by categories of runtime activity information sources monitored on the user devices to obtain a plurality of by-category training data sets further comprises:
segmenting by user device operating system to obtain a plurality of by-category training data sets for different operating system types.

12. The medium of claim 1, wherein segmenting the behavior data by categories of runtime activity information sources monitored on the user devices to obtain a plurality of by-category training data sets further comprises:
segmenting by user device runtime environment information to obtain a plurality of by-category training data sets for similar user devices.

13. The medium of claim 1, wherein forming a plurality of records in a training data set based on behavior data corresponding respective user devices comprises:
identifying behavioral data corresponding to a given user device; and
forming a set of records associated with an identifier of the given user device in the training data set.

14. The medium of claim 13, wherein:
the machine learning model is trained based on at least the set of records associated with the identifier of the given user device; and
the machine learning model is transmitted to the given user device.

15. The medium of claim 14, wherein:
another version of the machine learning model is trained based on at least a different set of records associated with a different identifier of a different user device; and
the another version is transmitted to the different user device and not to the given user device.

16. The medium of claim 1, wherein training, based on the training data set, a machine learning model to output an indication of whether runtime activity information obtained from the category of runtime activity information source corresponds to ransomware activity comprises:
training the at least one other machine learning model to output an indication of whether runtime activity information obtained from the another category of runtime activity source corresponding to ransomware activity based on a second training data set different from the first training data set.

17. The medium of claim 16, wherein:
at least three different machine learning models are trained, each machine learning model outputting an indication of whether runtime activity information obtained from a different category of runtime activity information source corresponds to ransomware activity.

18. The medium of claim 16, wherein:
at least four different machine learning models are trained, each machine learning model outputting an indication of whether runtime activity information obtained from a different category of runtime activity information source corresponds to ransomware activity.

19. The medium of claim 1, further comprising:
means for training a set of runtime activity source specific machine learning models.

20. The medium of claim 1, further comprising:
means for monitoring runtime activity sources on user devices.

21. A computer-implemented method, comprising: obtaining, with one or more processors, device behavior data from a plurality of user devices, the device behavior data includes runtime activity information associated with respective user devices; segmenting, with one or more processors, the device behavior data by categories of runtime activity information sources monitored on the user devices to obtain a plurality of by-category training data sets; forming, with one or more processors, a plurality of records in a training data set based on the device behavior data corresponding respective user devices, a first subset of the records being labeled as malicious based on indications of a subset of user devices affected by ransomware and a second subset of the records being labeled as non-malicious based on indications of another subset of user devices not affected by ransomware; training, with one or more processors, based on the training data set, a machine learning model to output an indication of whether runtime activity information obtained from the category of runtime activity information source corresponds to ransomware activity; and transmitting, with one or more processors, the machine learning model and at least one other machine learning model for another category of runtime activity source to at least some of the user devices, wherein each of the at least some user devices execute a set of machine learning models to monitor a set of runtime activity information sources for ransomware activity.

* * * * *